United States Patent
Nagaraj et al.

(10) Patent No.: US 8,581,933 B2
(45) Date of Patent: Nov. 12, 2013

(54) SYSTEM AND METHOD FOR DISPLAYING A ROTATED IMAGE IN A DISPLAY DEVICE

(75) Inventors: Guruprasad Nagaraj, Bangalore (IN); Krishna Koteshwara Sridhar Murthy, Bangalore (IN); Vijayalaxmi Patil, Bangalore (IN); Nataraja Kambadahalli Muniyappa, Bangalore (IN); Sunil Ramappa Nyamagouda, Bangalore (IN)

(73) Assignee: LG Electronics Inc., Seoul (KR)

( * ) Notice: Subject to any disclaimer, the term of this patent is extended or adjusted under 35 U.S.C. 154(b) by 825 days.

(21) Appl. No.: 12/195,873

(22) Filed: Aug. 21, 2008

(65) Prior Publication Data

US 2009/0096813 A1     Apr. 16, 2009

Related U.S. Application Data

(60) Provisional application No. 60/969,825, filed on Sep. 4, 2007, provisional application No. 61/012,832, filed on Dec. 11, 2007, provisional application No. 61/043,490, filed on Apr. 9, 2008.

(51) Int. Cl.
*G09G 5/00* (2006.01)
*G09G 5/37* (2006.01)
*G06F 13/00* (2006.01)

(52) U.S. Cl.
USPC .......................... 345/649; 345/537; 345/562

(58) Field of Classification Search
USPC .......................... 345/649, 562; 382/296, 297
See application file for complete search history.

(56) References Cited

U.S. PATENT DOCUMENTS

| | | | |
|---|---|---|---|
| 3,976,982 A * | 8/1976 | Eiselen | 382/284 |
| 4,593,407 A * | 6/1986 | Konishi et al. | 382/297 |
| 4,757,302 A | 7/1988 | Hatakeyama et al. | |
| 4,806,920 A | 2/1989 | Sawada | |
| 4,947,344 A | 8/1990 | Hayashi et al. | |
| 4,947,377 A * | 8/1990 | Hannai | 365/208 |
| 5,095,422 A * | 3/1992 | Horiguchi | 711/201 |
| 5,134,390 A | 7/1992 | Kishimoto et al. | |
| 5,189,404 A * | 2/1993 | Masimo et al. | 345/659 |
| 5,208,914 A * | 5/1993 | Wilson et al. | 710/39 |
| 5,329,289 A | 7/1994 | Sakomoto et al. | |
| 5,640,517 A * | 6/1997 | Parks et al. | 710/105 |
| 5,644,758 A * | 7/1997 | Patrick et al. | 345/562 |
| 5,751,293 A | 5/1998 | Hashimoto et al. | 345/430 |
| 5,850,232 A * | 12/1998 | Engstrom et al. | 345/539 |
| 5,854,641 A * | 12/1998 | Howard et al. | 345/571 |

(Continued)

OTHER PUBLICATIONS

U.S. Office Action dated Mar. 14, 2011 for U.S. Appl. No. 12/195,972.

(Continued)

*Primary Examiner* — M Good Johnson
(74) *Attorney, Agent, or Firm* — KED & Associates LLP

(57) ABSTRACT

A method controls display of an image by dividing a source image into a plurality of M×N blocks of pixels, selecting a first one of the blocks, and transferring the pixels in the first block from a source memory to a display memory, the pixels in the first block transferred based on orientation change information. The selecting and transferring steps are then repeated to transfer pixels in remaining ones of the blocks to the display memory. Each block corresponds to only a portion of the source image, where any given portion represents less than a full line of pixels in the source image.

14 Claims, 21 Drawing Sheets

(56) References Cited

U.S. PATENT DOCUMENTS

| | | | |
|---|---|---|---|
| 5,973,664 A * | 10/1999 | Badger | 345/659 |
| 6,173,089 B1 | 1/2001 | Van Lerberghe | 382/299 |
| 6,330,374 B1 | 12/2001 | Yamaguchi et al. | |
| 6,346,972 B1 | 2/2002 | Kim | |
| 6,405,280 B1 * | 6/2002 | Ryan | 711/105 |
| 6,470,098 B2 | 10/2002 | Yamaguchi et al. | |
| 6,639,603 B1 | 10/2003 | Ishii | |
| 6,757,447 B2 * | 6/2004 | Yamaguchi et al. | 382/293 |
| 6,760,035 B2 | 7/2004 | Tjandrasuwita | 345/545 |
| 6,819,334 B1 | 11/2004 | Owada et al. | |
| 6,904,473 B1 * | 6/2005 | Bloxham et al. | 710/22 |
| 7,113,194 B2 | 9/2006 | Mamona et al. | |
| 7,120,317 B1 * | 10/2006 | Wu et al. | 382/296 |
| 7,259,772 B2 | 8/2007 | Koh | |
| 7,411,620 B2 * | 8/2008 | Taniguchi et al. | 348/294 |
| 7,411,630 B2 | 8/2008 | Kim et al. | |
| 7,528,837 B2 * | 5/2009 | Kitagawa | 345/537 |
| 7,587,524 B2 * | 9/2009 | Cho et al. | 710/22 |
| 7,701,472 B2 | 4/2010 | Obinata | |
| 7,742,063 B2 * | 6/2010 | Leung et al. | 345/649 |
| 7,751,652 B2 | 7/2010 | Tighe | |
| 7,800,634 B2 | 9/2010 | Baek et al. | |
| 8,159,440 B2 * | 4/2012 | Furihata et al. | 345/98 |
| 2002/0057242 A1 | 5/2002 | Yoneda et al. | 345/87 |
| 2002/0091916 A1 * | 7/2002 | Dowling | 712/228 |
| 2002/0101439 A1 | 8/2002 | Mamona et al. | 345/649 |
| 2002/0118158 A1 * | 8/2002 | Yamamoto et al. | 345/89 |
| 2002/0186229 A1 | 12/2002 | Brown Elliott | 345/649 |
| 2003/0016226 A1 | 1/2003 | Lu et al. | 345/555 |
| 2003/0231195 A1 | 12/2003 | Ueno et al. | |
| 2004/0125103 A1 | 7/2004 | Kaufman et al. | 345/419 |
| 2004/0252135 A1 | 12/2004 | Ono | 345/619 |
| 2005/0152197 A1 * | 7/2005 | Cho et al. | 365/221 |
| 2006/0033760 A1 | 2/2006 | Koh | 345/649 |
| 2006/0056738 A1 | 3/2006 | Keithley et al. | 382/307 |
| 2007/0005795 A1 | 1/2007 | Gonzalez | |
| 2007/0165716 A1 * | 7/2007 | Kitamura et al. | 375/240.12 |
| 2008/0186292 A1 * | 8/2008 | Park et al. | 345/204 |
| 2008/0285652 A1 * | 11/2008 | Oxman et al. | 375/240.16 |

OTHER PUBLICATIONS

International Search Report and Written Opinion dated Jun. 1, 2009.
International PCT Search Report and Written Opinion dated Jun. 18, 2009.
PCT International Search Report dated Jul. 28, 2009.
U.S. Office Action dated May 13, 2011 for U.S. Appl. No. 12/195,649.
U.S. Office Action dated May 9, 2012 for U.S. Appl. No. 12/195,649.
U.S. Office Action dated Nov. 16, 2011 for U.S. Appl. No. 12/195,649.
Notice of Allowance dated Nov. 2, 2011 for U.S. Appl. No. 12/195,972.

* cited by examiner

SYSTEM AND METHOD FOR DISPLAYING A ROTATED IMAGE IN A DISPLAY DEVICE

This application claims priority to Provisional Application Nos. 60/969,825 filed Sep. 4, 2007, 61/012,832 filed Dec. 11, 2007 and 61/043,490 filed Apr. 9, 2008 whose entire disclosures are incorporated herein by reference.

FIELD

One or more embodiments described herein relate to the processing of images for presentation on a display device.

BACKGROUND

When viewing an image on a display device, it may be desirable to rotate or change the orientation of the image to obtain a more pleasing viewing experience or for a variety of other reasons. While systems have been developed to rotate an image on a display, these systems have significant drawbacks. For example, different code is used to perform different degrees of image rotation. This substantially increases the cost and complexity of the application software for driving the display. Also, many systems have prolonged processing times and other inefficiencies which make them undesirable, especially from the standpoint of the user.

BRIEF DESCRIPTION

FIG. 10 shows a different arrangement of blocks in a source image.

FIG. 11 shows another arrangement of blocks in a source image.

FIG. 14 is a diagram showing how one embodiment may be implemented for rotating a source image by 180 degrees.

FIG. 16 is a diagram showing how one embodiment may be implemented for rotating a source image by 270 degrees.

DETAILED DESCRIPTION

Figure 1A:
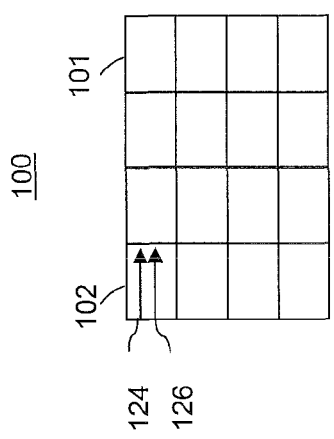
FIG. 1(a) is a diagram showing a source image.

FIG. 1(a) shows a source image 100 formed from a plurality of pixels. The source image may include text, graphics, video, or other information capable of being viewed on a display device, which, for example, may be a television or monitor, the latter of which may be provided alone or within a processing device such as a notebook or desktop computer. More specific examples of the display device include but are not limited to a Liquid Crystal Display (LCD), Thin Film Transistor (TFT) LCD, a plasma display panel (PDP), and an electroluminescent display (organic or inorganic).

Under normal conditions, the source image is displayed in a predetermined orientation. However, in certain circumstances (e.g., for improved viewing or convenience to the user), it may be desirable to change the orientation of the source image. The source image may have its orientation changed through rotation, by flipping it to produce a mirror image, or in accordance with any one of a variety of other techniques.

Figure 1D:
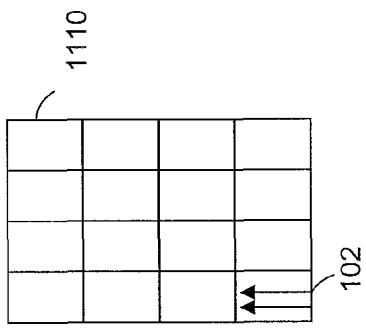
FIGS. 1(b)-(d) show different examples of how the orientation of the source image may be changed in accordance with one or more embodiments described herein.
Figure 1C:
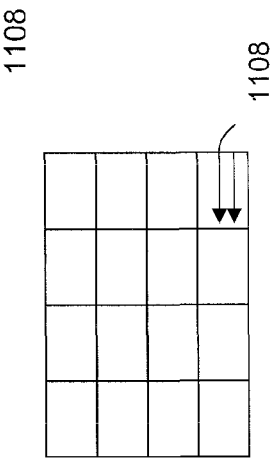
Figure 1B:
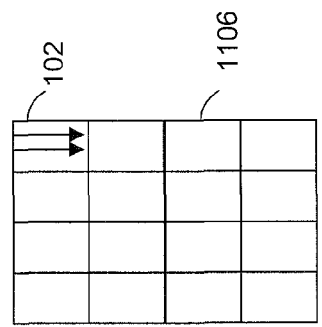

For illustrative purposes, FIGS. 1(b)-(c) show how the source image 100 may be rotated by various angles to produce corresponding display images. When the source image is rotated by 90°, display image 1106 in FIG. 1(b) is produced. When the source image is rotated by 180°, display image 1108 shown in FIG. 1(c) is produced. And, when the source image is rotated by 270°, display image 1110 shown in FIG. 1(d) is produced.

Figure 2:
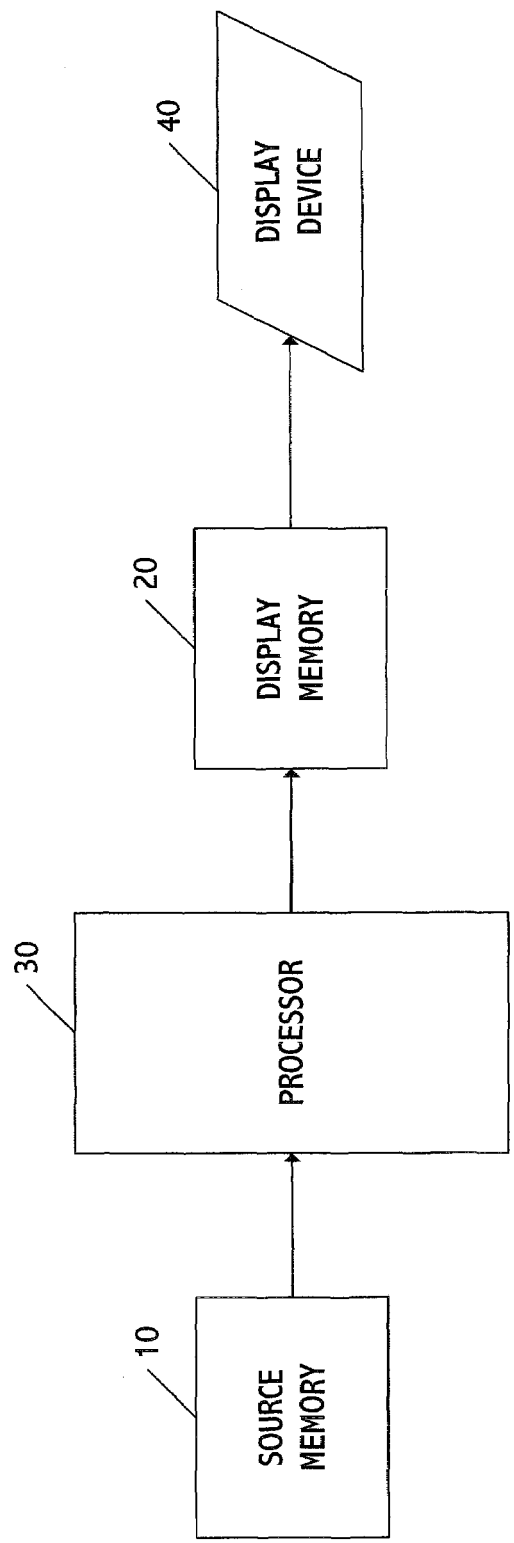
FIG. 2 is a diagram showing one embodiment of a system for changing an orientation of a source image to generate a display image.

FIG. 2 shows one embodiment of a system that may be used to rotate or otherwise change the orientation of the source image to produce a display image for presentation on a display device. The system includes a source memory 10 or other storage device for storing the source image. The orientation of the image may be changed by translating the pixels in the source image to different locations in a display memory 20. The source and display memories may correspond to different sections of a common memory unit or, for example, may be located on different integrated circuit chips. In order to perform the orientation change, a processor 30 may be included to control the translation of pixels from the source memory to the display memory. The pixels may be translated to locations in the display memory based on the change in orientation desired, and various memory pointers may be controlled to perform the translation. The image in the display memory is then output for viewing on display device 40.

Figure 3:
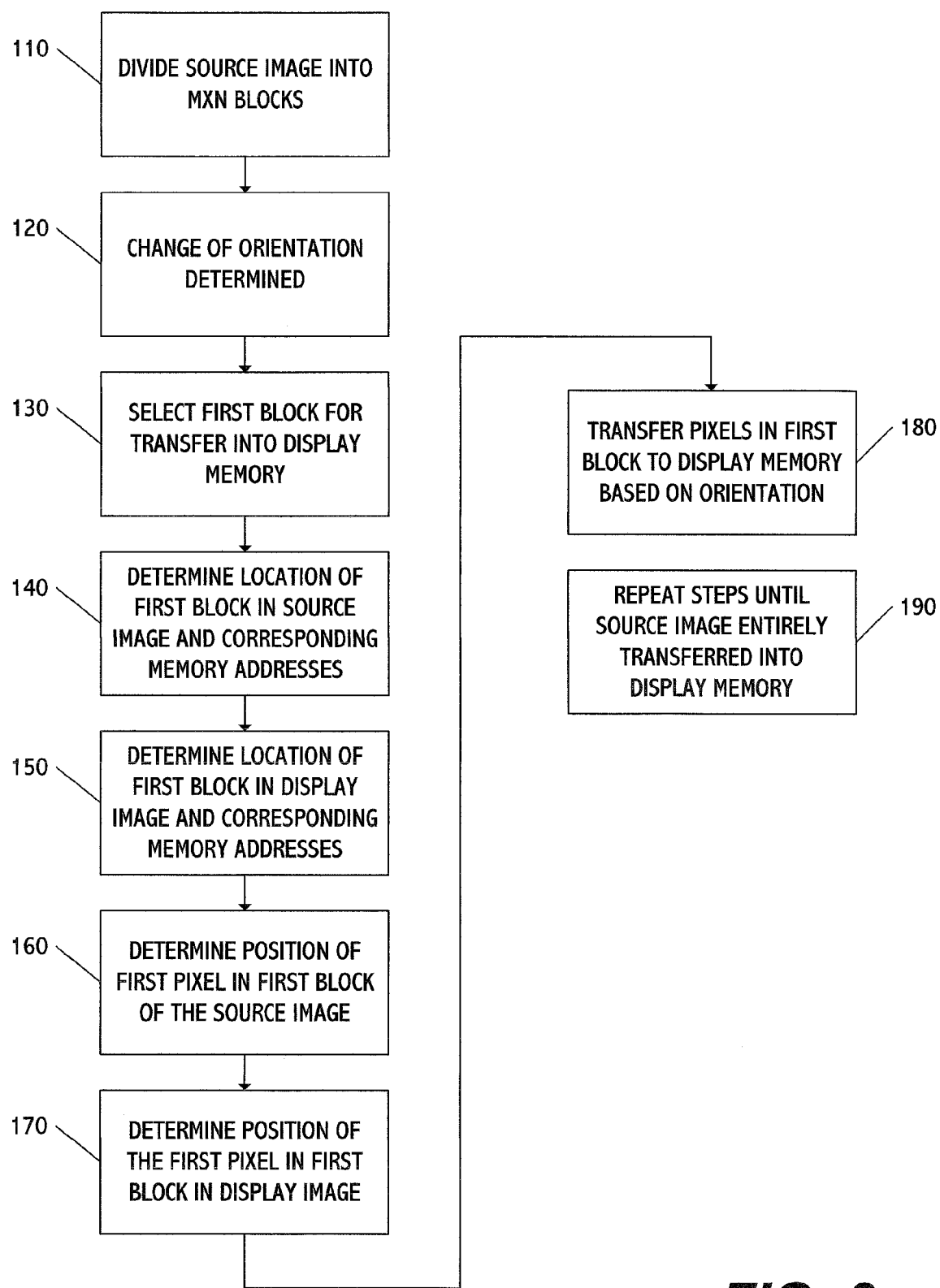
FIG. 3 is a diagram showing steps included in one embodiment of a method for changing an orientation of a source image to generate a display image.

FIG. 3 shows steps included in one embodiment of a method for changing the orientation of a source image for display. In accordance with this embodiment, the pixels in the source image are transferred from the source memory to the display memory on a block-by-block basis, in accordance with the change in orientation to be made. As with all embodiments disclosed herein, the method may be implemented using the system shown in FIG. 2 or another system may be used. The method of FIG. 3 may be understood with reference to examples of how orientation of the source image may be changed as shown in FIGS. 1(b)-(d).

To perform an orientation change, an initial step includes dividing source image 100 into a plurality of blocks 101. (Block 110). Preferably, the source image is divided into M×N blocks, where each block has 2≤M<total number of lines (rows) in the source image, and where each line has N pixels with 2≤N< the total number of pixels in each image line. In alternative embodiments, the source image may be divided into blocks of different sizes.

In a second step, the change in orientation of the source image is determined. (Block 120). This change may, for example, involve rotation of the source image by some selected or designated angle. The angle of rotation may be manually input into the system by a user or designated automatically, for example, by changing the orientation of a rotatable screen of the display device.

In a third step, a first block 102 (which may be referred to as a source rectangle) is selected for transfer into the display memory. (Block 130). This block may be a predetermined one of the blocks in the source image (e.g., an upper left corner block) or may be selected on some other predetermined basis or randomly. This block is selected for transfer into a location in the display memory that corresponds to the designated change in orientation. For example, if the change in orientation corresponds to a 90° rotation, then block 102 will be transferred into a memory location in the display memory that corresponds to this angle of rotation.

In a fourth step, the coordinates of the first rectangle are determined based on the change in orientation. (Block 140). This step includes determining the location (e.g., coordinates) of the first rectangle in the source image. This location corresponds to a set of memory addresses in the source memory in which data values for the pixels in the first block are stored. A memory pointer of the source memory is adjusted to correspond to these addresses, and preferably initially to the memory address that corresponds to a first pixel in the first block.

In a fifth step, the location that corresponds to the changed orientation in the display image is then determined. (Block 150). This location corresponds to the coordinates of the first block as transferred into the display image. These coordinates correspond to a set of memory addresses in the display memory in which the data values for the pixels in the first block are stored. A memory pointer of the display memory is adjusted to correspond to these addresses. The positions of the memory pointers are automatically updated as the pixels in the first block are transferred from the source memory to the display memory in accordance with the selected orientation.

By way of illustration, when the designated change in orientation is a 90° rotation, first block 102 is rotated to the position shown in FIG. 1(b). When the designated change in orientation is a 180° rotation, first block 102 is rotated to the position shown in FIG. 1(c). And, when the designated change in orientation is 270°, first block 102 is rotated to the position shown in FIG. 1(d).

In a sixth step, the position of the first pixel in the first block in the source image is determined. (Block 160). This position may correspond to the pixel located in an upper left corner of the first block or some other pixel position. For illustrative purposes, the first pixel position may correspond to the starting point of the arrow 124 that corresponds to the first image line in the first block shown in FIG. 1(a).

In a seventh step, the position of the first pixel in the first block as translated into the display image is determined. This pixel position is determined based on the designated change in orientation (Block 170) and, for example, may correspond to the starting point of arrow 124 shown in FIG. 1(b) for a 90° rotation. The memory pointers in the source and display memories are respectively controlled to correspond to these positions.

In an eighth step, all the pixels in image line 124 contained within the first block are transferred from the source memory to correspond locations in the display memory based on the designated change in orientation. (Block 180). The transfer of pixels in this image line may be performed sequentially and the memory pointers of the source and display memories are controlled (e.g., incremented) in order to effect this transfer. Then, the remaining lines in the first block are transferred in a similar manner. This line-by-line transfer continues until all pixels in the first block are transferred into the display memory according to the designated change in orientation.

After the first block in the source image has been transferred, the remaining portions of the source image are transferred to the display memory, on a block-by-block basis, in accordance with the designated orientation. This may involve predetermined (e.g., sequential) selection of blocks after the first block transfer takes place, with the image lines/pixels in each block being transferred, for example, based on an analogous application of the steps corresponding Blocks 140-180.

At the conclusion of these steps, the source image will be transferred in its entirety into the display memory. The resulting image is then displayed on a screen of the display device in the changed orientation. Thus, the foregoing embodiment transfers only M image lines containing N pixels per line to the display memory in each block. The values of M and N are selected to be less than all the image lines and less than all the pixels in each image line respectively. As a result, within each block, pixels in one image line are transferred before all pixels in a preceding image line are transferred to the display memory; that is, the foregoing embodiment does not step seriatim through all pixels in an image line before pixels in a succeeding image line are transferred to the display memory.

Figure 4:
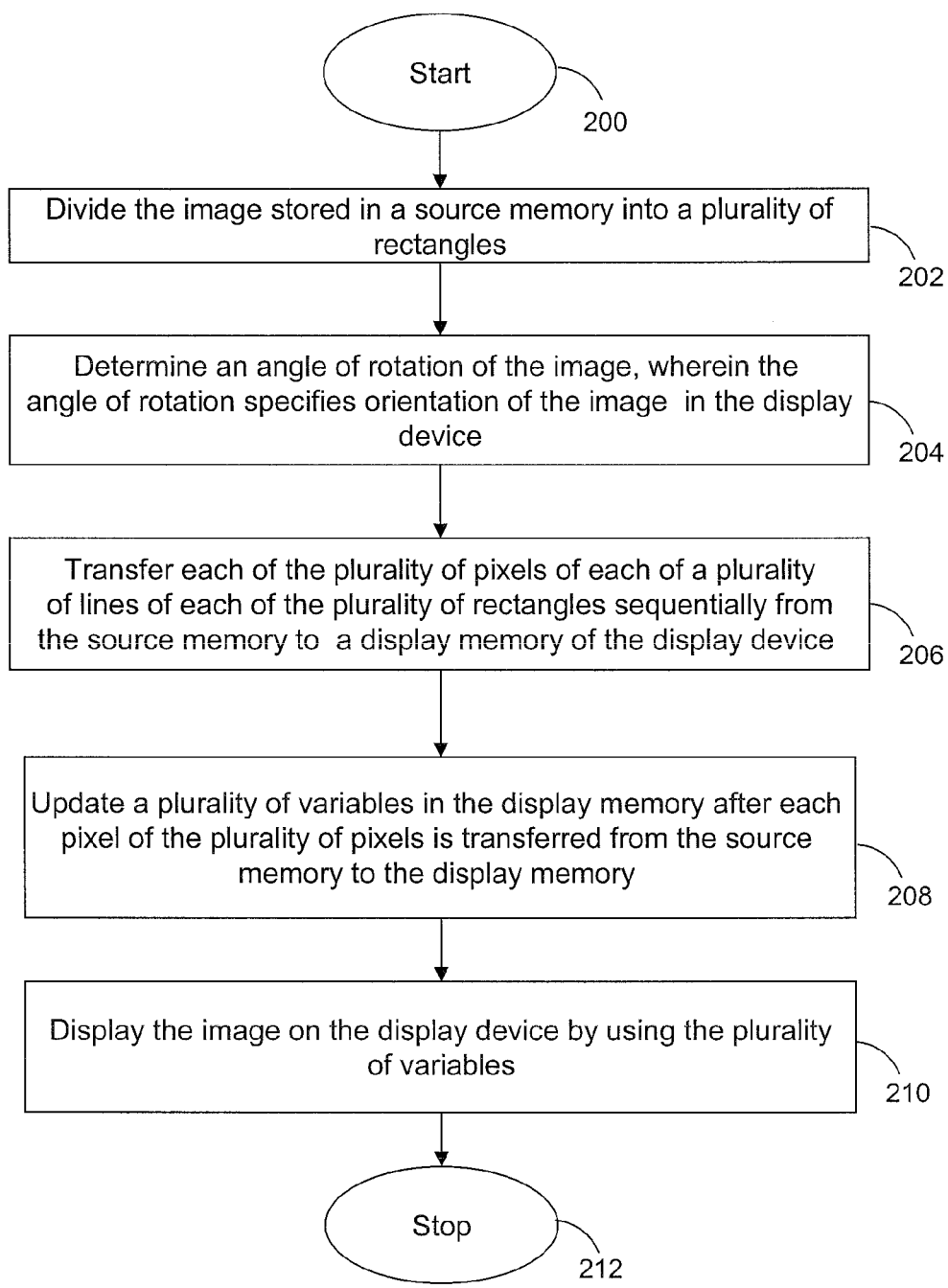
FIG. 4 is a flow diagram showing steps included in another embodiment of a method for changing the orientation of a source image.

FIG. 4 shows steps included in another embodiment of a method for changing the orientation of a source image. The method is initiated at step 200 when a request for displaying the source image on the display device is received by driver program code. The request for displaying the source image on the display screen can be sent by an application program, an operating system, or a user defined program interface.

The driver program code processes the request for displaying the source image, by taking into account the angle of rotation of the image and by initializing a plurality of variables. Thereafter, the variables are updated based on the angle of rotation of the source image, and the updated variables are then used to display the rotated image in the display device.

At step 202, the driver program code divides the source image into a plurality of blocks (e.g., rectangles). Each block preferably has the same predetermined dimension and includes a plurality of pixels, arranged in respectively lines. For example, block 102 in FIG. 1(a) includes lines 124 and 126. Moreover, each block preferably has more than one but less than all of the lines in the source image, and each line in the block preferably has more than one but less than the total number of pixels in any given image line in the source image.

At step 204, the angle of rotation of the source image is determined by the driver program code. At step 206, the source image is transferred to the display memory, on a block-by-block basis, according to the angle of rotation. This may be accomplished by sequentially transferring the lines in each block from the source memory to the display memory based on the angle of rotation. The pixels in each line may also be sequentially transferred. That is, the pixels in image line 124 in first block 102 may be sequentially transferred, following by the pixels in image line 126 in the first block. (See FIG. 1(*a*)).

Transfer of the pixels in each line, and the lines in each block is preferably performed under control of the driver program code. In accordance with one embodiment, if all the pixels in the source image are not fully covered by the blocks (e.g., see FIG. 10 where an example of a source image 136 is shown to have a length of 10 units and width of 9 units and each block has a predefined size equal to a length of 3 units and width of 2 units), then blocks 138, 139, 142, 144, 146, 148, 149, 152, 154, 156, 158 and 159 may be transferred sequentially. Thereafter, the remaining area 162 of the image 136 is transferred pixel-by-pixel to the display memory.

In another embodiment, shown in FIG. 11, initially blocks 138, 139 and 142 may be transferred to the display memory. Thereafter, remaining area 164 of the image 136 (i.e. area (10*3−3*(3*2)) may be transferred. Thereafter, blocks 144, 146 and 148 are transferred to the display memory. Thereafter, remaining area 166 of the image 136 (i.e. area (10*3−3*(3*2)) is transferred. Thereafter, blocks 149, 152 and 154 are transferred to the display memory. Thereafter, remaining area 168 of the image 136 (i.e. area (10*3−3*(3*2)) is transferred. Thereafter, blocks 156, 158 and 160 are transferred to the display memory. Thereafter, remaining area 169 of the image 136 (i.e. area (10*3−3*(3*2)) is transferred. Thereafter, remaining area (i.e. 10*1) 172 is transferred pixel by pixel to the display memory.

At step 208, a plurality of variables are updated by the driver program code after each pixel of the plurality of pixels of the source image is transferred to the display memory, these variables will be described in greater detail below. At step 210, the driver program code displays the source image rotated at the angle of rotation on the display device. The method terminates at step 212.

An algorithm implemented in the driver program code may be used for dividing the source image in to a plurality of blocks and for transferring the pixels in the lines of each block to the display memory. In order to accomplish this transfer, multiple variables may be updated by the algorithm in the display memory of the display device for displaying the image in the display device.

Figure 5:
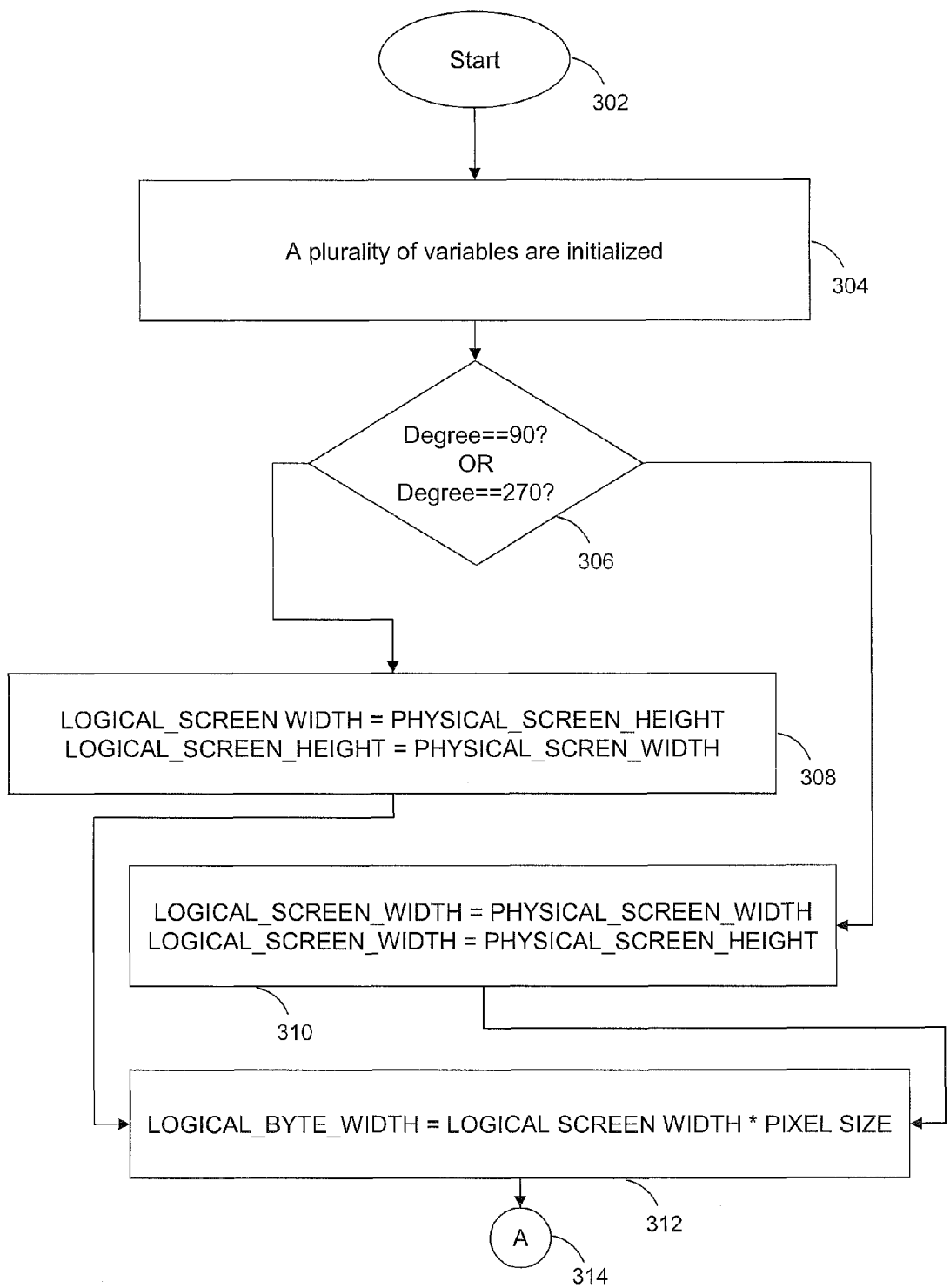
FIG. 5 is a flow diagram showing one way in which a plurality of variables may be initialized for changing the orientation of a source image.

FIG. 5 shows how a plurality of variables may be initialized for rotating a source image according to one or more embodiments. These variables include PIXEL_SIZE, PHYSICAL_SCREEN_WIDTH, PHYSICL_SCREEN_HEIGHT, PHYSICAL_BYTE_WIDTH, LOGICAL_SCREEN_WIDTH, LOGICAL_SCREEN_HEIGHT, LOGICAL_BYTE_WIDTH, SRC, DST, MEMORY_PTR, SCREEN_PTR, SRCRECT, DSTRECT, m_ileft, m_itop, m_iright and m_ibottom.

The method initiates, at step 302, when a request for displaying the source image on the display device with a changed orientation is received by the driver program code. At step 304, a size of the pixels in each line of the plurality of blocks of the source image is determined, and information indicative of the size of the pixels is stored in the PIXEL_SIZE variable.

The number of bits used to represent each pixel determines how many colors or shades of gray can be displayed. For example, in 8-bit color mode, 8 bits are assigned for each pixel of the plurality of pixels, thereby making it possible to display 2 to the 8th power (256) different colors or shades of gray of the source image. The size of the pixel can be selected by a user of the display screen, the application program, or the operation system. The size of each of the plurality of pixels can be set to one of a 1 byte per pixel (Palette Mode), 2 bytes per pixel (High color Mode), 3 bytes per pixel (True color Packaged Mode), or 4 bytes per pixel (True color aligned Mode).

Further, at step 304, the PHYSICAL_SCREEN_WIDTH is set equal to width in pixels of the source image in the source memory, for example if breadth of the source image is equal to 10 pixels, then the PHYSICAL_SCREEN_WIDTH variable is set to 10. Furthermore, at step 304, the PHYSICAL_SCREEN_HEIGHT variable is set equal to a height in pixels of the source image in the source memory, for example if height of the source image is 10 pixels, then the PHYSICAL_SCREEN_HEIGHT variable is set equal to 10.

Also, at step 304, the PHYSICAL_BYTE_WIDTH variable is set equal to a product of the PHYSICAL_SCREEN_WIDTH variable and the PIXEL_SIZE variable, for example if the PIXEL_SIZE variable is set equal to 1 byte and the PHYSICAL_SCREEN_WIDTH variable is set to 10. then the PHYSICAL_BYTE_WIDTH variable will be equal to 10 bytes.

Further, at step 304, a LOGICAL_SCREEN_WIDTH variable is set equal to the width in pixels of the source image after rotations. Furthermore, the LOGICAL_SCREEN_HEIGHT is set equal to the height in pixels of the source image after rotation. Also, the LOGICAL_BYTE_WIDTH is set equal to a product of LOGICAL_SCREEN_WIDTH variable and the PIXEL_SIZE variable.

Further at step 304, the SRC, DST, MEMORY_PTR, SCREEN_PTR, SRCRECT, DSTRECT, m_ileft, m_itop, m_iright and m_ibottom variables are initialized. The SRC variable is a pointer variable for traversing through the plurality of pixels in the source memory. The DST variable is a pointer variable for traversing the plurality of pixels in the display memory.

The MEMORY_PTR is a working pointer variable for traversing through each of the plurality of pixels in the source memory. The SCREEN_PTR is a working pointer variable for traversing through each of the plurality of pixels in the display memory. The SRCRECT defines the coordinates of a block in the source image in the source memory.

The DSTRECT defines the coordinates of each block of the plurality of blocks of the source image rotated at the angle of rotation in the display memory. The variables m_ileft, m_itop, m_iright and m_ibottom denote the coordinates of the source image.

At step 306, it is determined whether the angle of rotation of the image is 900 or 270°. If the angle of rotation of the source image is 90° or 270°, then, at step 308, the LOGICAL_SCREEN_WIDTH variable is set equal to the PHYSCIAL_SCREEN_HEIGHT variable and the LOGICAL_SCREEN_HEIGHT variable is set equal to the PHYSICAL_SCREEN_WIDTH variable. The control goes to 312 after the step 308.

If the angle of rotation of the source image is not 900° or 2700°, control goes to step 310, where the LOGICAL_SCREEN_WIDTH variable is set equal to the PHYSICAL_SCREEN_WIDTH variable and the LOGICAL_SCREEN_HEIGHT variable is set equal to the PHYSCIAL_SCREEN_HEIGHT variable.

Control then goes to step 312, where the LOGICAL_BYTE_WIDTH variable is set equal to a product of LOGICAL_SCREEN_WIDTH variable and the PIXEL_SIZE variable and the control goes to 314. At 314, it is determined whether the angle of the rotation of the source image is 0°, 90°, 1800°, or 270°. If the angle of the rotation of the image is 0°, control goes to a step 402, in a flow diagram which will be described in conjunction with FIG. 6. If the angle of the rotation of the image is 90°, control goes to a step 502, in a flow diagram which will be described in conjunction with FIG. 7. If the angle of the rotation of the image is 180°, control goes to a step 602 in a flow diagram which will be described in conjunction with FIG. 8. If the angle of the rotation of the image is 270°, control goes to a step 702, in a flow diagram which will be described in conjunction with FIG. 9.

Figure 6:
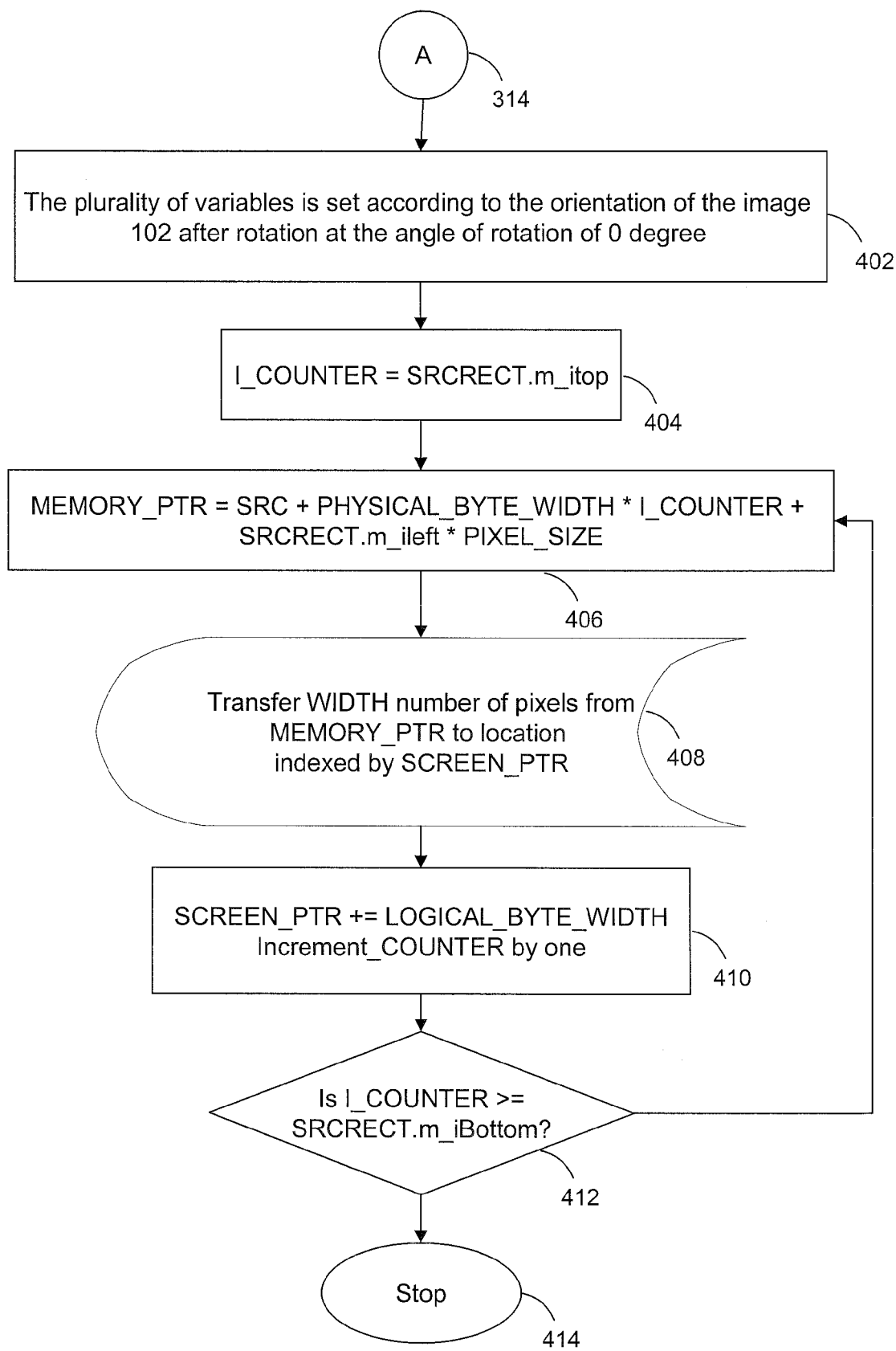
FIG. 6 is a flow diagram showing an embodiment for rotating a source image at a first angle of rotation.

FIG. 6 is a flow diagram illustrating an algorithm for rotation of the source image 102 at the angle of rotation of 0°. If the angle of the rotation is 0°, control goes to step 402 from the step 314. At step 402, the variables are set according to the change in orientation of the source image, e.g., after at angle of rotation of 0°.

Here, the DSTRECT.m_ileft variable is set equal to SRCRECT.m_ileft variable, the DSTRECT.m_itop variable is set equal to SRCRECT.m_itop variable, the DSTRECT.m_iright variable is set equal to SRCRECT.m_iright variable and the DSTRECT.m_ibottom variable is set equal to SRCRECT.m_ibottom variable. Further, a WIDTH variable is set equal to DSTRECT.M_IRIGHT−DSTRECT.m_ileft+1, the MEMORY_PTR variable is set equal to SRC variable, and the SCREEN_PTR variable is set equal to DST+LOGICAL_BYTE_WIDTH*(DSTRECT.m_itop)+DSTRECT.m_ileft*PIXEL_SIZE. The said operation is used for determining the start position of each of the plurality of pixels of each of the plurality of lines of each of the plurality of rectangles of the source image.

Thereafter, an I_COUNTER variable is set equal to SRCRECT.m_itop variable at step 404. Thereafter at step 406, the MEMORY_PTR variable is set equal to SRC+PHYSICAL_BYTE_WIDTH*I_COUNTER+SRCRECT.m_ileft*PIXEL_SIZE. Thereafter at step 408, the plurality of pixels equal to the WIDTH, starting from the address location pointed by the MEMORY_PTR is transferred to a location pointed by the SCREEN_PTR in the display memory. At step 410, the SCREEN_PTR variable is updated and set equal to a sum of a previous value of SCREEN_PTR and LOGICAL_BYTE_WIDTH variable, thereby transferring each of the plurality of pixels of each of the plurality of lines of each of the plurality of rectangles of the source image 102.

Further, at step 410, the I_COUNTER variable is incremented by 1. At step 412, it is determined, whether the I_COUNTER variable is greater than or equal to SRCRECT.m_ibottom variable. If the I_COUNTER variable is greater than or equal to SRCRECT.m_ibottom than, the method terminates at step 414. If the I_COUNTER variable is less than the SRCRECT.m_ibottom variable, then the control goes to step 406. The updated plurality of variables is used for displaying the image 102 in the display device.

Figure 7:
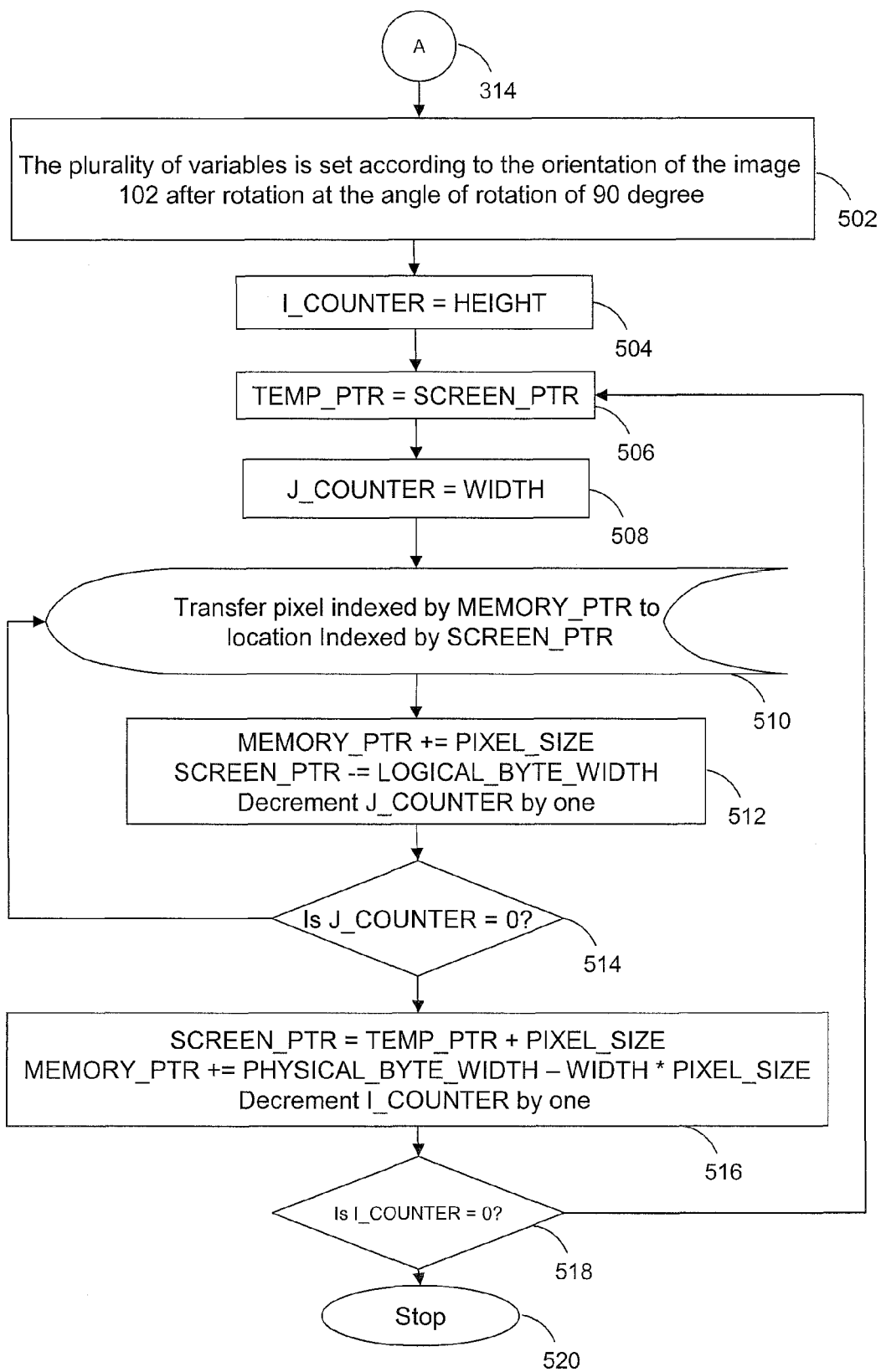
FIG. 7 is a flow diagram showing an embodiment for rotating a source image at a second angle of rotation.

FIG. 7 is a flow diagram illustrating an algorithm for rotation of the source image at a 90° angle. If the rotation angle is 90°, control goes to step 502 from the step 314. At step 502, variables are set according to the change in orientation designated for the source image, e.g., after 90° rotation. The DSTRECT.m_ileft variable is set equal to SRCRECT.m_itop variable, the DSTRECT.m_itop variable is set equal to LOGICAL_SCREEN_HEIGHT_SRCRECT.m_ileft−1. The said operation is used for determining the start position of each of the plurality of pixels of each of the plurality of lines of each of the plurality of rectangles of the source image.

Further, the WIDTH variable is set equal to SRCRECT.m_iright−SRCRECT.m_ileft and a HEIGHT variable is set equal to SRCRECT.m_ibottom variable−SRCRECT.m_itop. The said operation leads to an orientation of each of the plurality of rectangles of the source image 102 shown with reference to the rotated image 1106.

Further, at step 502, the SCREEN_PTR variable is set equal to DST+LOGICAL_BYTE_WIDTH*DSTRECT.m_ibottom+DSTRECT.m_ileft*PIXEL_SIZE. Furthermore, the MEMORY_PTR is set equal to SRC+PHYSCIAL_BYTE_WIDTH*SRCRECT.m_itop+SRCRECT.m_ileft*PIXEL_SIZE. At step 504, the I_COUNTER variable is set equal to the HEIGHT variable. Thereafter, at step 506 a TEMP_PTR variable is set equal to the SCREEN_PTR variable. The TEMP_PTR variable is a temporary pointer variable used for transferring each of the plurality of pixels in the source memory to the display memory. At step 508, a J_COUNTER variable is set equal to the WIDTH variable and thereafter, at step 510, a pixel of the plurality of pixels pointed by the MEMORY_PTR is transferred to the location pointed by the SCREEN_PTR.

At step 512, the MEMORY_PTR variable is updated and set equal to a sum of previous value of MEMORY_PTR and PIXEL_SIZE, thereby pointing to a subsequent pixel in the source memory. Further, the SCREEN_PTR variable is updated and set equal to a difference between the previous value of SCREEN_PTR variable and the LOGICAL_BYTE_WIDTH variable, thereby pointing to a subsequent location in the display memory according to the 90° rotation.

Further, the J_COUNTER variable is decremented by 1, since a pixel of the plurality of pixels is transferred to the display memory. At step 514, it is determined whether the J_COUNTER variable is equal to 0, if the J_COUNTER variable is equal to 0, then this indicates that the plurality of pixels in a particular line of the plurality of lines of a rectangle of the plurality of rectangles is transferred from the source memory to the display memory and control goes to step 516. If the J_COUNTER variable is not equal to 0, control goes to step 510.

At step 516, the SCREEN_PTR variable is updated and set equal to a sum of TEMP_PTR variable and the PIXEL_SIZE variable. Further, at step 516, the MEMORY_PTR variable is updated and set equal to a sum of previous value of MEMORY_PTR and a difference of PHYSICAL_BYTE_WIDTH and WIDTH*PIXEL_SIZE. Further, the I_COUNTER variable is decremented by 1, since a complete line of the plurality of line of the rectangle of the plurality of rectangles is transferred to the display memory from the source memory.

Thereafter, at step 518, it is determined, whether the I_COUNTER variable is equal to 0, then this indicates that the complete rectangle of the plurality of rectangle is transferred to the display memory from the source memory and the method terminates at step 520. If the I_COUNTER variable is not equal to zero, then the control goes to step 506. The source image rotated at 90° takes up an orientation as shown with reference to the rotated image 1106.

Figure 8:
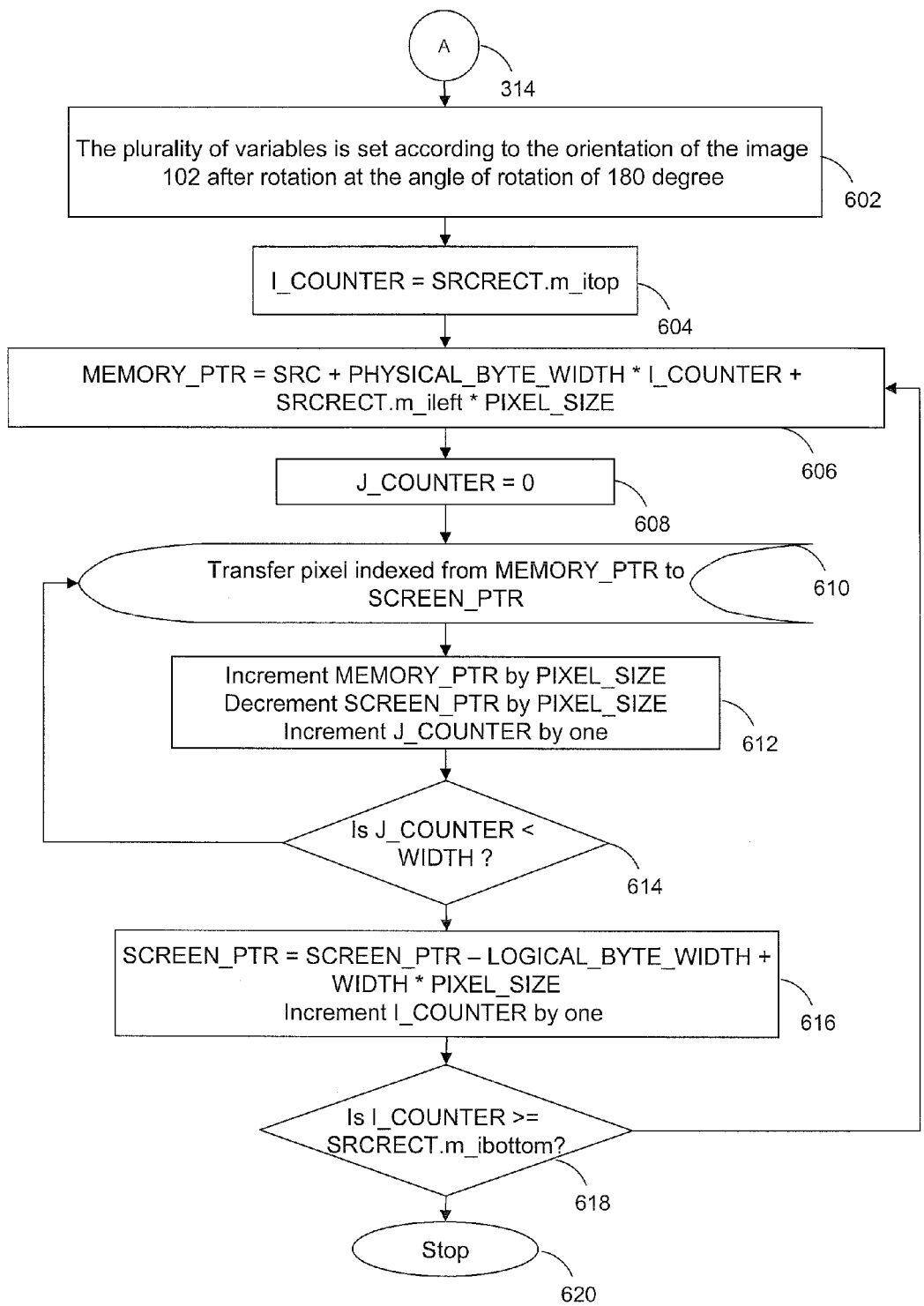
FIG. 8 is a flow diagram showing an embodiment for rotating a source image at a third angle of rotation.

FIG. 8 is a flow diagram illustrating an algorithm for rotation of the source image at the angle of rotation of 180°. If the angle of the rotation of the source image is 180°, control goes to step 602 from the step 314. At step 602, the plurality of variables is set according to the orientation of the source image after rotation at the angle of rotation of 180°. The DSTRECT.m_ileft variable is set equal to LOGICAL_SCREEN_WIDTH_SRCRECT.m_iright−1, the DSTRECT.m_itop variable is set equal to LOGICAL_SCREEN_HEIGHT_SRCRECT.m_ibottom−1, the DSTRECT.m_iright variable is set equal to LOGICAL_SCREEN_WIDTH_SRCRECT.m_ileft−1, the DSTRECT.m_ibottom variable is set equal to LOGICAL_SCREEN_HEIGHT_SRCRECT.m_itop−1.

The said operation is used for determining the start position of each of the plurality of pixels of each of the plurality of lines of each of the plurality of rectangles of the source image. Further, the WIDTH variable is set equal to DSTRECT.M_IRIGHT_DSTRECT.m_ileft+1, the MEMORY_PTR variable is set equal to SRC variable, and the SCREEN_PTR variable is set equal to DST+LOGICAL_BYTE_WIDTH*(DSTRECT.m_ibottom)+DSTRECT.m_iright*PIXEL_SIZE. Thereafter, the I_COUNTER variable is set equal to SRCRECT.m_itop variable at step 604. At step 606, the MEMORY_PTR variable is set equal to SRC+PHYSICAL_BYTE_WIDTH*I_COUNTER+SRCRECT.m_ileft*PIXEL_SIZE. Thereafter at step 608, the J_COUNTER variable is set equal to 0.

At step 610, a pixel pointed by the MEMORY_PTR in the source memory is transferred to a location in display memory pointed by SCREEN_PTR and the control goes to step 612. At step 612, the MEMORY_PTR variable is incremented by the PIXEL_SIZE, thereby pointing to the next pixel of the plurality of pixel in the source memory. Further, at step 612, the SCREEN_PTR is decremented by the PIXEL_SIZE, thereby pointing to a next location in the display memory. Furthermore, the J_COUNTER is incremented by 1.

At step 614, it is determined whether, the J_COUNTER variable is less than the WIDTH variable. If the J_COUNTER variable is less than the WIDTH variable, then this indicates that the particular line of the plurality of lines of the rectangle of the plurality of rectangle is not transferred to the display memory and therefore the control goes to step 610. If at step 614, it is determined that the J_COUNTER variable is more than or equal to the WIDTH variable, then this indicates that the line of the plurality of lines of the rectangle of the plurality of rectangle is transferred to the display memory, for example the line 124 of block 102 and control goes to step 616.

At step 616, the SCREEN_PTR is updated and set equal to SCREEN_PTR−LOGICAL_BYTE_WIDTH+WIDTH*PIXEL_SIZE. Thereafter, the control goes to step 618, and at step 618, it is determined whether, the I_COUNTER is greater than or equal to SRCRECT.m_ibottom. The I_COUNTER variable is greater than or equal to SRCRECT.m_ibottom when the complete rectangle of the plurality of rectangles is transferred to the display memory from the source memory and the method terminates at step 620. If the I_COUNTER is not greater than or equal to SRCRECT.m_ibottom, then this indicates that the rectangle of the plurality of rectangle is not transferred completely (i.e. some lines of the plurality of lines are left to be transferred to the display memory) to the display memory from the source memory and the control goes to step 606. The source image rotated at the angle of rotation of 180° takes up an orientation as shown with reference to the rotated image 1108.

Figure 9:
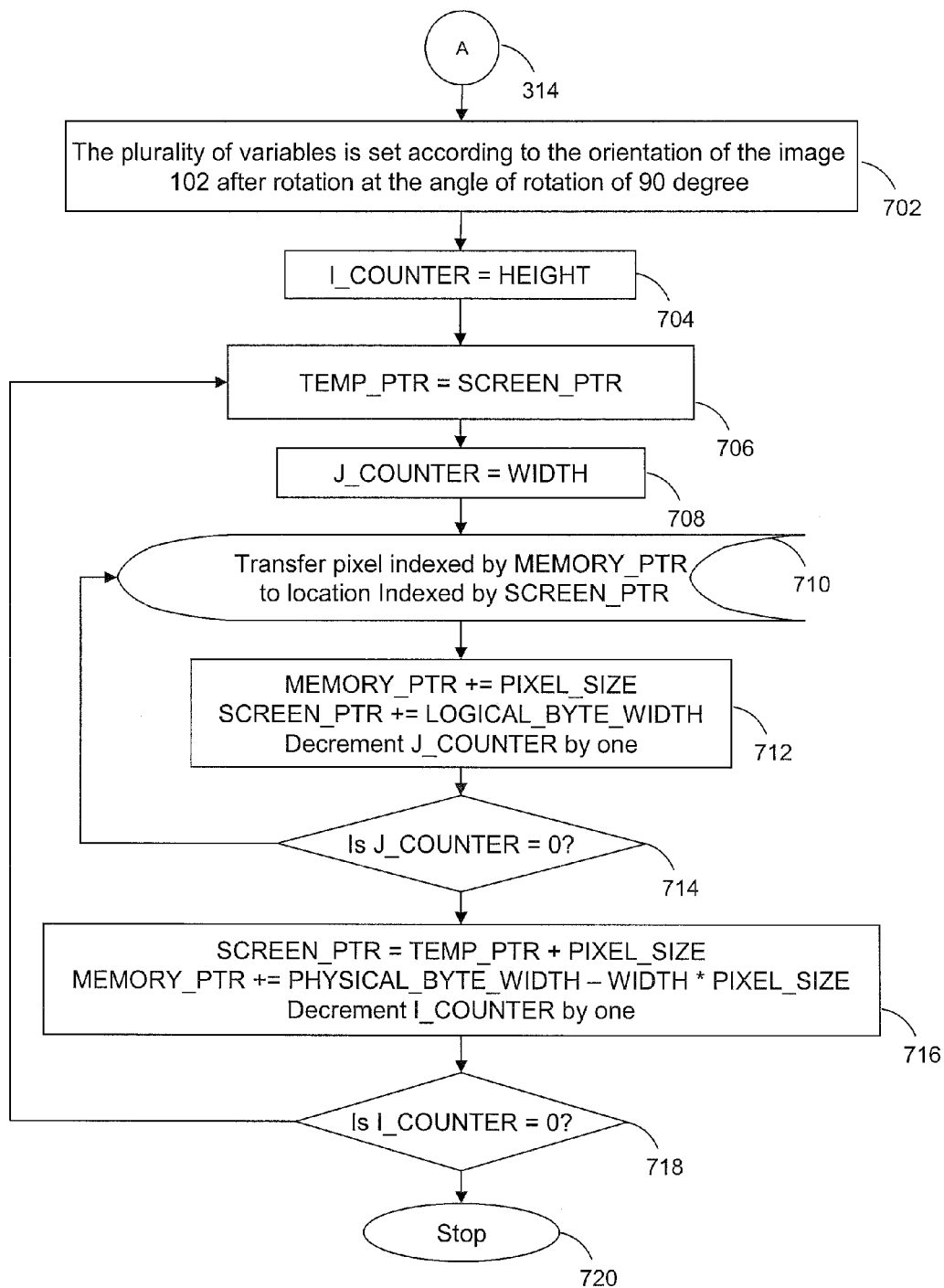
FIG. 9 is a flow diagram showing an embodiment for rotating a source image at a fourth angle of rotation.

FIG. 9 is a flow diagram illustrating an algorithm for rotation of the source image at the angle of rotation of 270°. If the angle of the rotation of the source image is 270°, control goes to step 702 from the step 314. At step 702, variables are set according to the orientation of the source image after 270°. The DSTRECT.m_ileft variable is set equal to LOGICAL_SCREEN_WIDTH_SRCRECT.m_ibottom−1, the DSTRECT.m_itop variable is set equal to SRCRECT.m_ileft variable, the DSTRECT.m_iright is set equal to LOGICAL_SCREEN_WIDTH−SRCRECT.m_itop−1, and the DSTRECT.m_ibottom variable is set equal to SRCRECT.m_iright. The said operation is used for determining the start position of each of the plurality of pixels of each of the plurality of lines of each of the plurality of rectangles of the source image.

Further, the WIDTH variable is set equal to SRCRECT.m_iright−SRCRECT.m_ileft and a HEIGHT variable is set equal to SRCRECT.m_ibottom variable−SRCRECT.m_itop. The said operation leads to an orientation of each of the blocks of the source image shown with reference to the rotated image 1110.

Further at step 702, the SCREEN_PTR variable is set equal to DST+LOGICAL_BYTE_WIDTH*DSTRECT.m_itop+DSTRECT.m_iright*PIXEL_SIZE. Furthermore, the MEMORY_PTR is set equal to SRC+PHYSCIAL_BYTE_WIDTH*SRCRECT.m_itop+SRCRECT.m_ileft*PIXEL_SIZE. At step 704, the I_COUNTER variable is set equal to the HEIGHT variable. Thereafter, at step 706 a TEMP_PTR variable is set equal to the SCREEN_PTR variable. The TEMP_PTR variable is a temporary pointer variable used for transferring each of the plurality of pixels in the source memory to the display memory. At step 708, a J_COUNTER variable is set equal to the WIDTH variable and thereafter, at step 710, a pixel of the plurality of pixels pointed by the MEMORY_PTR is transferred to the location pointed by the SCREEN_PTR.

At step 712, the MEMORY_PTR variable is updated and set equal to a sum of previous value of MEMORY_PTR and PIXEL_SIZE, thereby pointing to a subsequent pixel in the source memory. Further, the SCREEN_PTR variable is updated and set equal to a sum of previous value of SCREEN_PTR variable and the LOGICAL_BYTE_WIDTH variable, thereby pointing to a subsequent location in the display memory according to the angle of rotation of 270°. Further, the J_COUNTER variable is decremented by 1, since a pixel of the plurality of pixels is transferred to the display memory.

At step 714, it is determined whether the J_COUNTER variable is equal to 0, if the J_COUNTER variable is equal to 0, then this indicates that the plurality of pixels in a particular line of the plurality of lines of a rectangle of the plurality of rectangles is transferred from the source memory to the display memory and control goes to step 716. If the J_COUNTER variable is not equal to 0 then control goes to step 710. At step 716, the SCREEN_PTR variable is updated and set equal to a difference of TEMP_PTR variable and the PIXEL_SIZE variable. Further, at step 716, the MEMORY_PTR variable is updated and set equal to a sum of previous value of MEMORY_PTR and a difference of PHYSICAL_BYTE_WIDTH and WIDTH*PIXEL_SIZE.

Further, the I_COUNTER variable is decremented by 1, since a complete line of the plurality of lines of the block is copied to the display memory from the source memory. Thereafter, at step 718, it is determined, whether the I_COUNTER variable is equal to 0, then this indicates that the complete rectangle of the plurality of rectangle is transferred to the display memory from the source memory and the method terminates at step 720. If the I_COUNTER variable is not equal to zero, then the control goes to step 706. The source image rotated at the angle of rotation of 270° takes up an orientation as shown with reference to the rotated image 1110.

The algorithms described with reference to FIGS. 6-9 are implemented by driver program code on each of the plurality of blocks of the source image 102. Once the said algorithms are performed on each of the said rectangles, then the source image is converted into an orientation according to the angle of rotation in the display device.

An additional embodiment may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention.

An additional embodiment may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the change of orientation in accordance with the foregoing embodiments has been described as corresponding to an angular rotation of the source image, those skilled in the art can appreciate that the embodiments may be implemented to perform other types of orientation changes such as generating a mirror image or inverse of the source image, as well as other changes affecting image appearance or presentation.

In accordance with one or more additional embodiments disclosed herein, a source image may include text, graphics, video, or other information capable of being viewed on a display device, which, for example, may be a television or monitor, the letter of which may be provided alone or within a processing device such as a notebook or desktop computer. More specific examples of the display device include but are not limited to a Liquid Crystal Display (LCD), Thin Film Transistor (TFT) LCD, a plasma display panel (PDP), and an electroluminescent display (organic or inorganic).

Under normal conditions, the source image is displayed in a predetermined orientation. However, in certain circumstances, it may be desirable to change the orientation of the source image prior to display.

Figure 12:
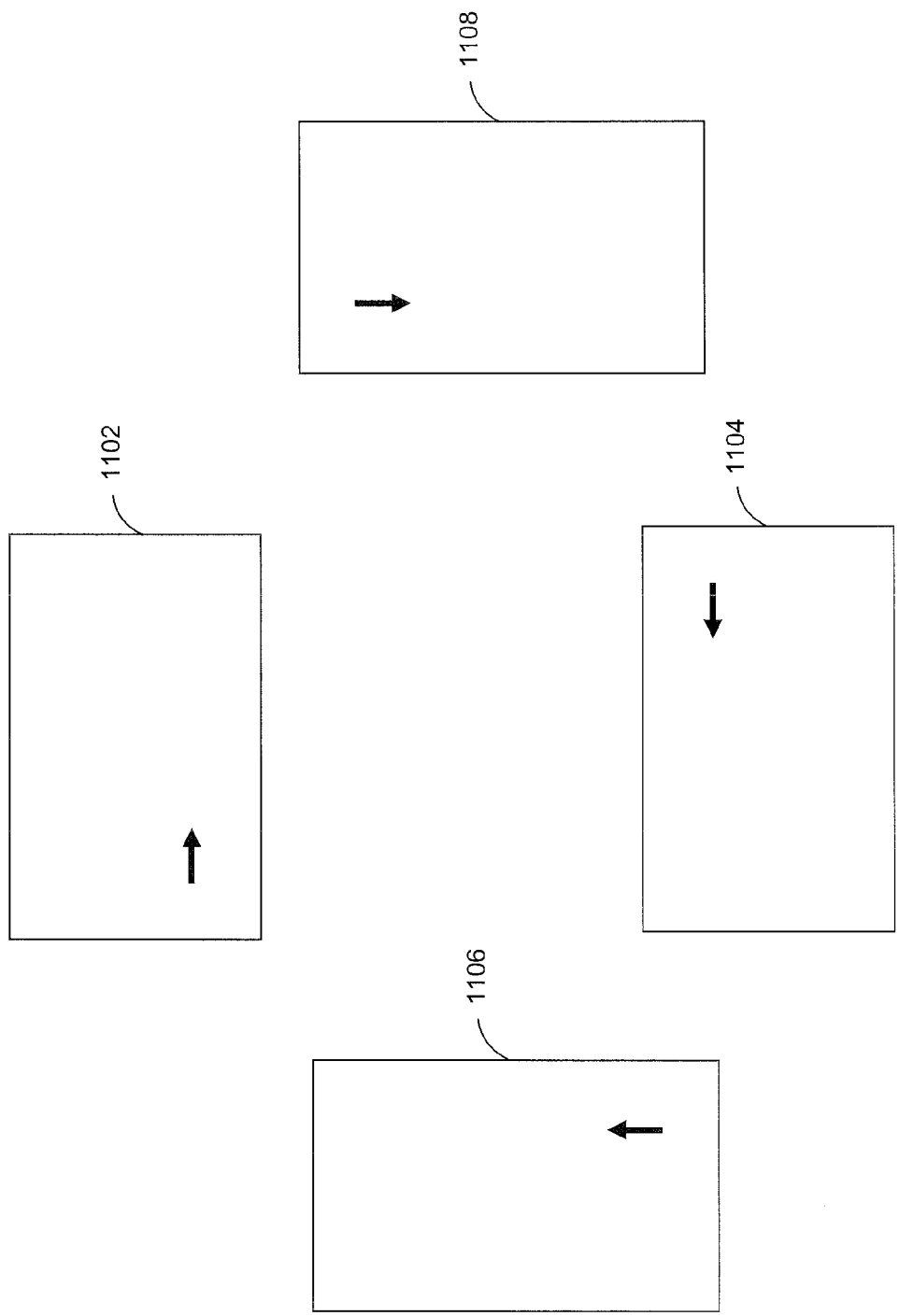
FIG. 12 shows various ways in which the orientation of a source image may be changed in accordance with one or more additional embodiments disclosed herein.

FIG. 12 shows various ways in which the orientation of a source image 1102 may be changed for display. In these examples, the orientation change involves rotating the image by some angle, e.g., image 1108 represents a 90 degree rotation of the source image, image 1104 represents a 180 degree rotation of the source image, and image 1106 represents a 270 degree rotation of the source image. In other embodiments, different orientation changes (e.g., mirror image, etc.) may be performed. The image whose orientation has been changed may be referred to as a display image.

Figure 13:
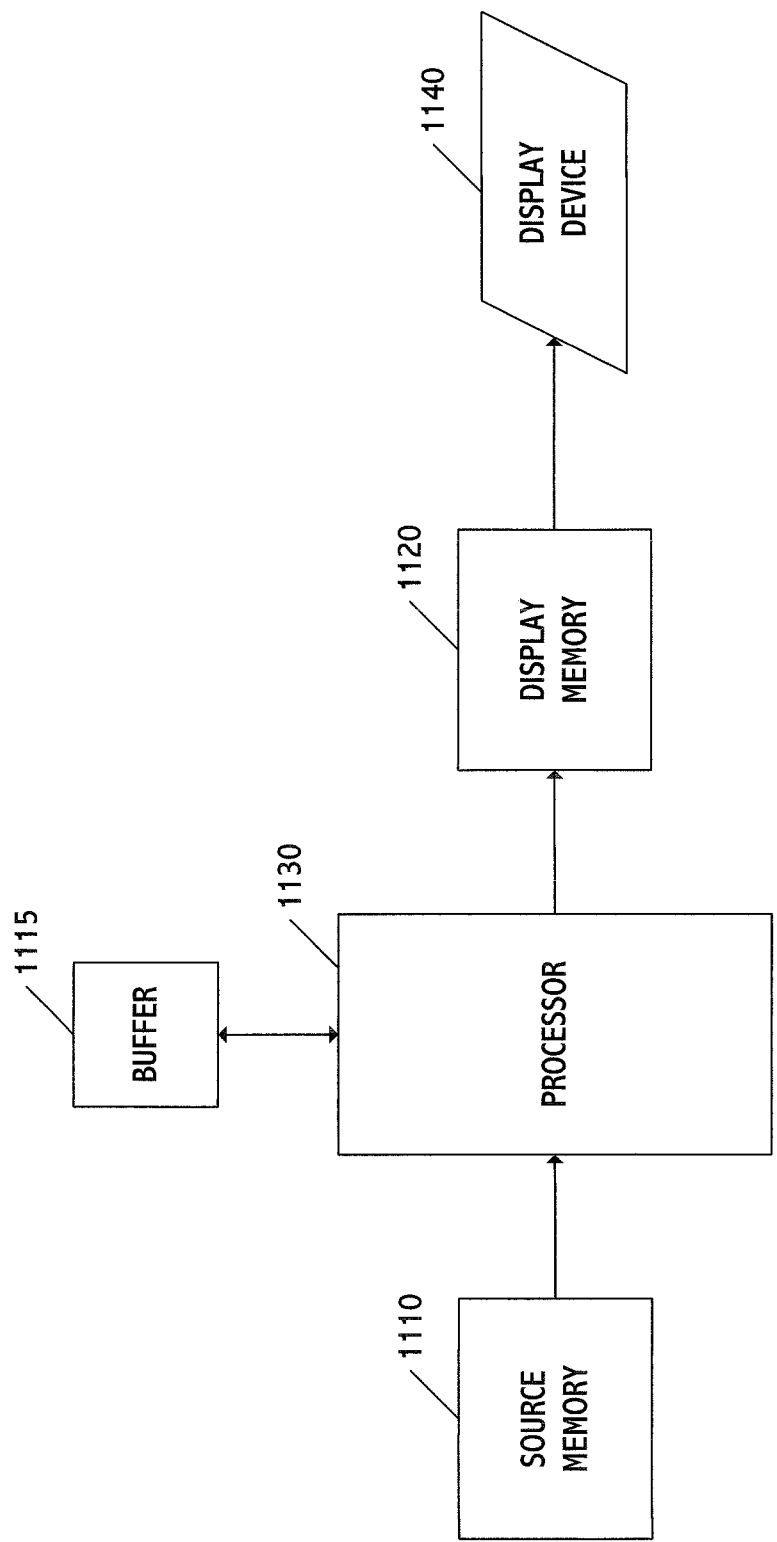
FIG. 13 shows one embodiment of a system for changing the orientation of a source image.

As shown in FIG. 13, the source image may initially be stored in a source memory 1110. The orientation of the source image may be changed by translating pixels in the source image to different locations in a display memory 1120. According to one embodiment or for some angles of rotation, the translation of these pixels is performed with the assistance of buffer 1115. In other embodiments of for other angles of rotation, the translation of pixels may be performed without using this buffer. The source and display memories and the buffer may correspond to different sections of a common memory unit or, for example, may be located on different integrated circuit chips. In order to perform the orientation change, a processor 1130 may be included to control the translation of pixels among the source memory, display memory, and buffer where necessary. The image in the display memory is then output for viewing on display device 1140.

The source image includes a plurality of lines, each line having a plurality of pixels. The size of each pixel depends, for example, on the resolution of the display device. If the resolution of the display device is set to a maximum value, pixel size may be equal to a physical size of a dot pitch of the display device. If, however, the resolution is set to a value less than the maximum value, pixel size may be larger than the physical size of the dot pitch or the pixel will use more than one dot on the display device.

The source image can be rotated by any desired angle. When rotated by an angle of 180 degrees, the source image A request for displaying the source image at some angle of rotation can be sent by an application program, an operating system, or a user defined program interface. The driver program code processes the request for displaying the rotated source image by, first, initializing a first set of plurality of variables and a second set of plurality of variables and then using those variables to control transfer of pixels from the source memory into translation positions in the display memory according to the change of orientation to be performed.

Figure 14:
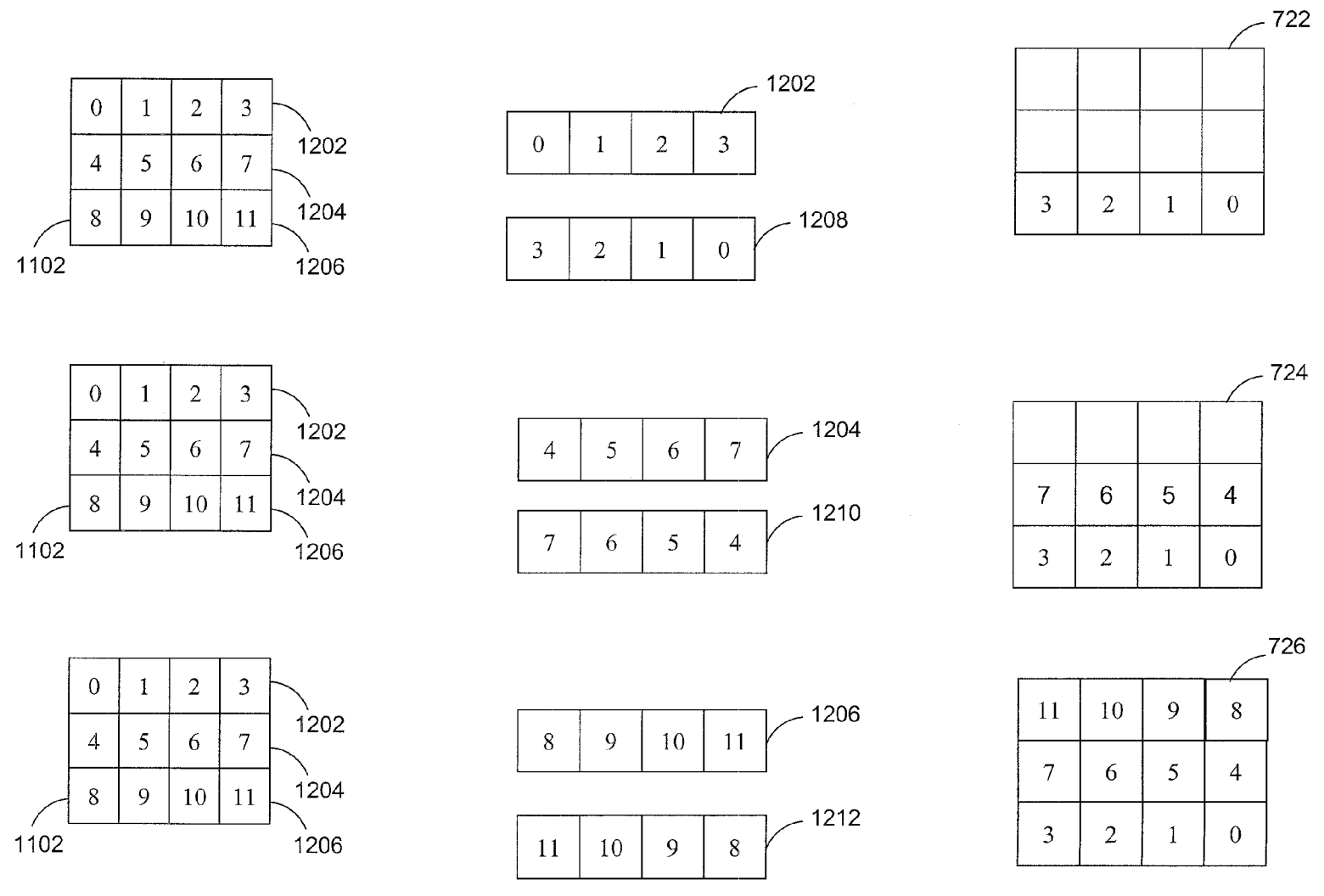

FIG. 14 conceptually shows how one embodiment may be implemented for rotating a source image at the angle of 180 degrees. Initially, driver program code processes a request for displaying the source image 1102 at the 180 degree angle of rotation. For purposes of illustration, the source image is shown to include three lines 1202, 1204, and 1206, each line having four pixels. Line 1202 comprises pixels numbered as 0, 1, 2, and 3, line 1204 includes pixels numbered as 4, 5, 6 and 7, and line 1206 includes pixels numbered as 8, 9, 10 and 11.

The driver program code copies each of lines 1202, 1204 and 1206 to a memory buffer. This memory buffer is an intermediate memory for performing an operation of rotating image 1102 at the angle of rotation of 180 degrees. Initially, line 1202 is copied to the memory buffer, thereafter line 1204 is copied to the memory buffer and after that the line 206 is copied to the memory buffer.

After line 1202 is copied to the memory buffer, driver program code reverses a position of each of the pixels 0, 1, 2, and 3 and preferably stores the result in the buffer. Line 1208 corresponds to line 1202 rotated at a 180 degree angle of rotation and, accordingly, shows that the positions of pixels 0, 1, 2 and 3 are reversed. With the positions of pixels 0, 1, 2 and 3 reversed, line 1208 is transferred to the display memory as shown in image 722.

Next, line 1204 is copied from the source memory to the buffer and the driver program code reverses positions of pixels 4, 5, 6 and 7. Line 1210 corresponds to line 1204 rotated by 180 degrees. The positions of pixels 4, 5, 6 and 7 are reversed using the buffer, and the reversed pixels are transferred to the display memory as shown in image 1724.

Next, line 1206 is copied to the buffer and driver program code reverses positions of pixels 8, 9, 10 and 11. Line 1212 corresponds to line 1206 rotated by 180 degrees. The positions of pixels 8, 9, 10 and 12 are reversed in line 1212 using the buffer. With the positions of pixels 8, 9, 19 and 11 reversed, line 1212 is transferred to the display memory, as shown in image 726. The rotated image 1104 is formed after all the lines in the source image are reversed and transferred into the display memory using the memory buffer. The change in positions of the pixels from the source image may be performed differently for other angles of rotation, or not at all. The angle of orientation (or otherwise the change in orientation to be implemented) is therefore used as a basis for determining how the pixels are translated for storage into the display memory. The driver program code may store or otherwise obtained access to this translation information in predetermined form.

More specifically, for a 180 degree rotation, an algorithm implemented in the driver program code is used for reversing the positions of the pixels in each source image line and for transferring the reversed pixels to the display memory. In order to accomplish these steps, a first set of a plurality of variables is updated by an algorithm (discussed below) in the display memory of the display device for displaying the image in the display device.

Figure 15:
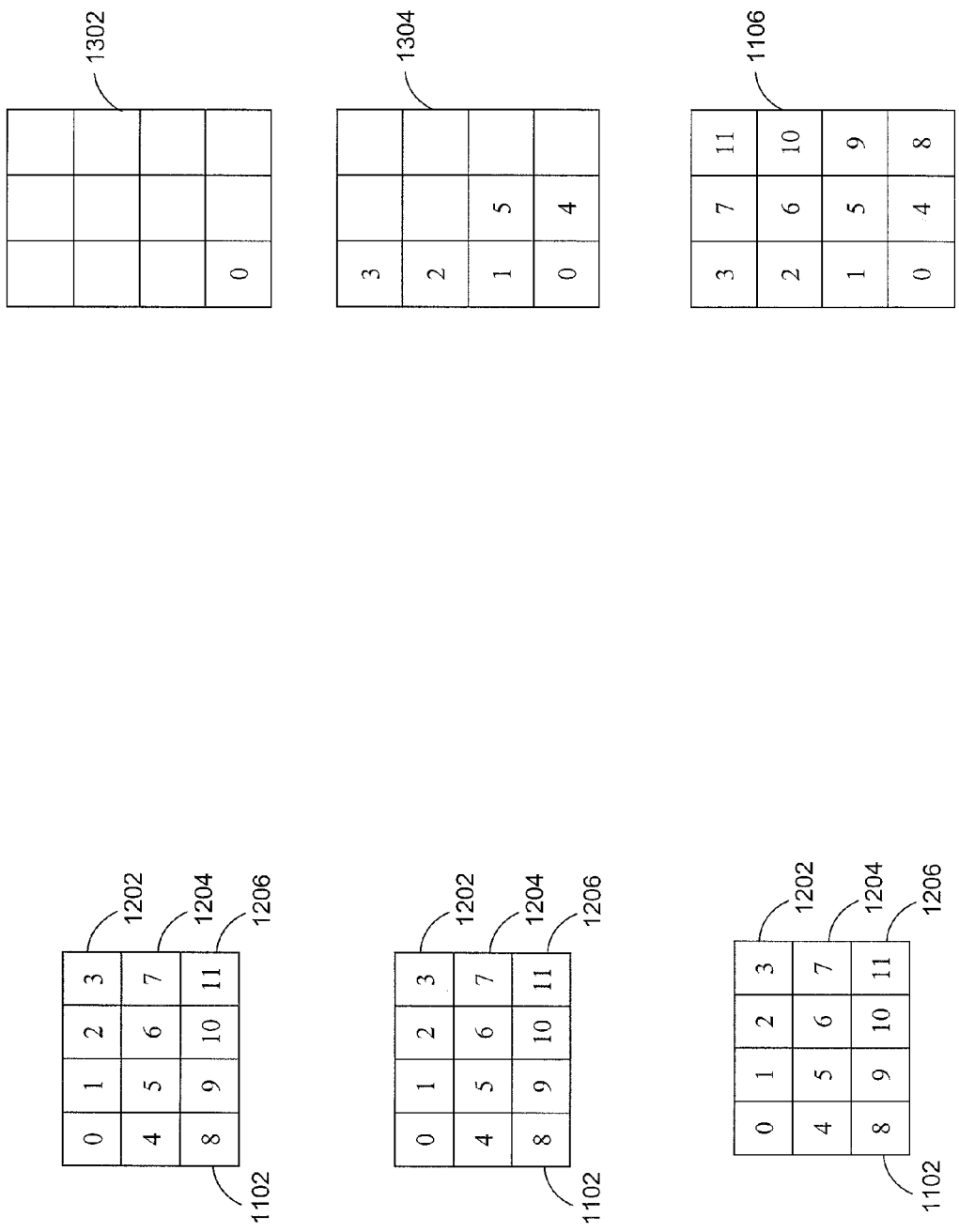
FIG. 15 is a diagram showing how one embodiment may be implemented for rotating a source image by 90 degrees.
Figure 17A:
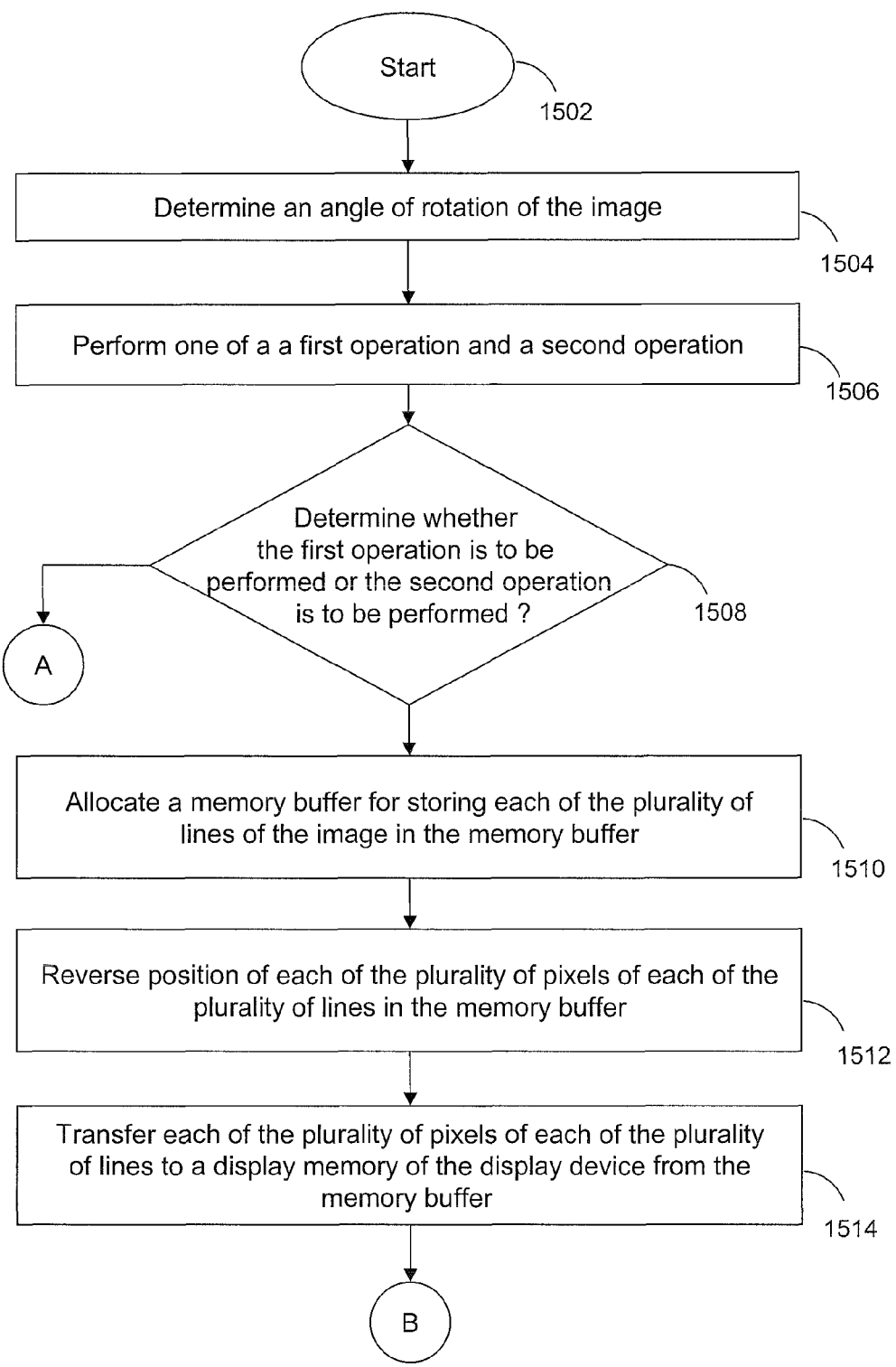
FIGS. 17A and 17B are flow diagrams showing steps included in a method for displaying a source image having a changed orientation according to one or more embodiments herein.
Figure 17B:
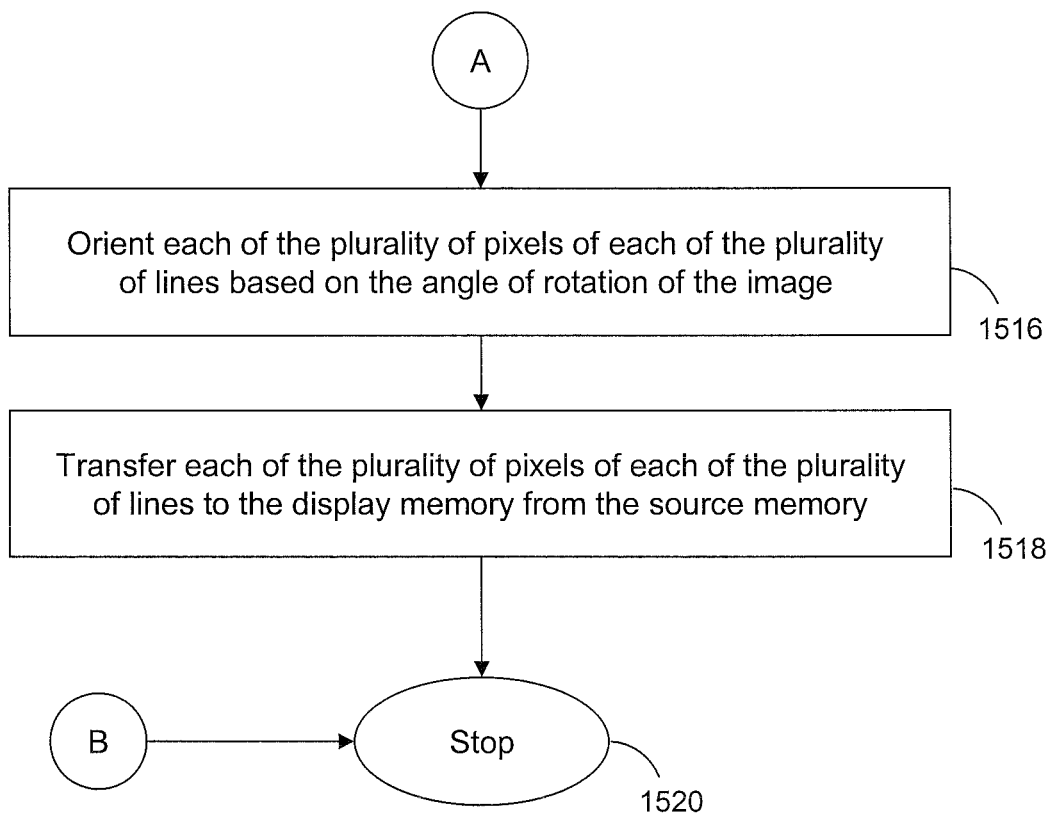

FIG. 15 is a diagram conceptually showing how one embodiment may be implemented for rotating a source image by 90 degrees. As in the foregoing embodiment, driver program code processes a request for displaying the image at a rotated angle of 90 degrees. A width of the source image may be equal to a number of pixels in each line of the source image. For example, image 1102 may have a width of 4 pixels. A height of the image may be equal to a number of lines in the image. For example, the image may have a height of 3 pixels.

Each pixel in each line of the source image may be treated sequentially for transfer to the display memory. The width of the source image 1102 rotated by 90 degrees may be equal to the height of the source image and the height of the source image rotated by 90 degrees may be equal to the width of the source image. For example, the width of image 102 rotated at the angle of 90 degrees is 3 pixels and the height of image 1102 rotated at the angle of rotation of 90 degrees is 4 pixels.

Initially, each of the plurality of pixels of the line 1202 of the image 1102 may be transferred sequentially. For example, initially, pixel 0 may be transferred. The result of this transfer is shown in image 1302. Thereafter, pixel 1 may be transferred, and so on. After each of line 1202 is transferred to the display memory, each of the plurality of pixels 4, 5, 6 and 7 of line 1204 may be transferred. The rotated image after transfer of pixels 0, 1, 2, 3, 4 and 5 is shown with reference to an image 1304. Thereafter, each of pixels 8, 9, 10 and 11 of line 1206 may be transferred to the display memory and the rotated image 1106 is formed.

An algorithm implemented in the driver program code is used for transferring each of the plurality of pixels of each of the plurality of lines 1202, 1204 and 1206 sequentially to the display memory. Further, a second set of a plurality of variables (discussed below) are updated by the algorithm in the display memory of the display device for displaying the image in the display device.

Figure 16:
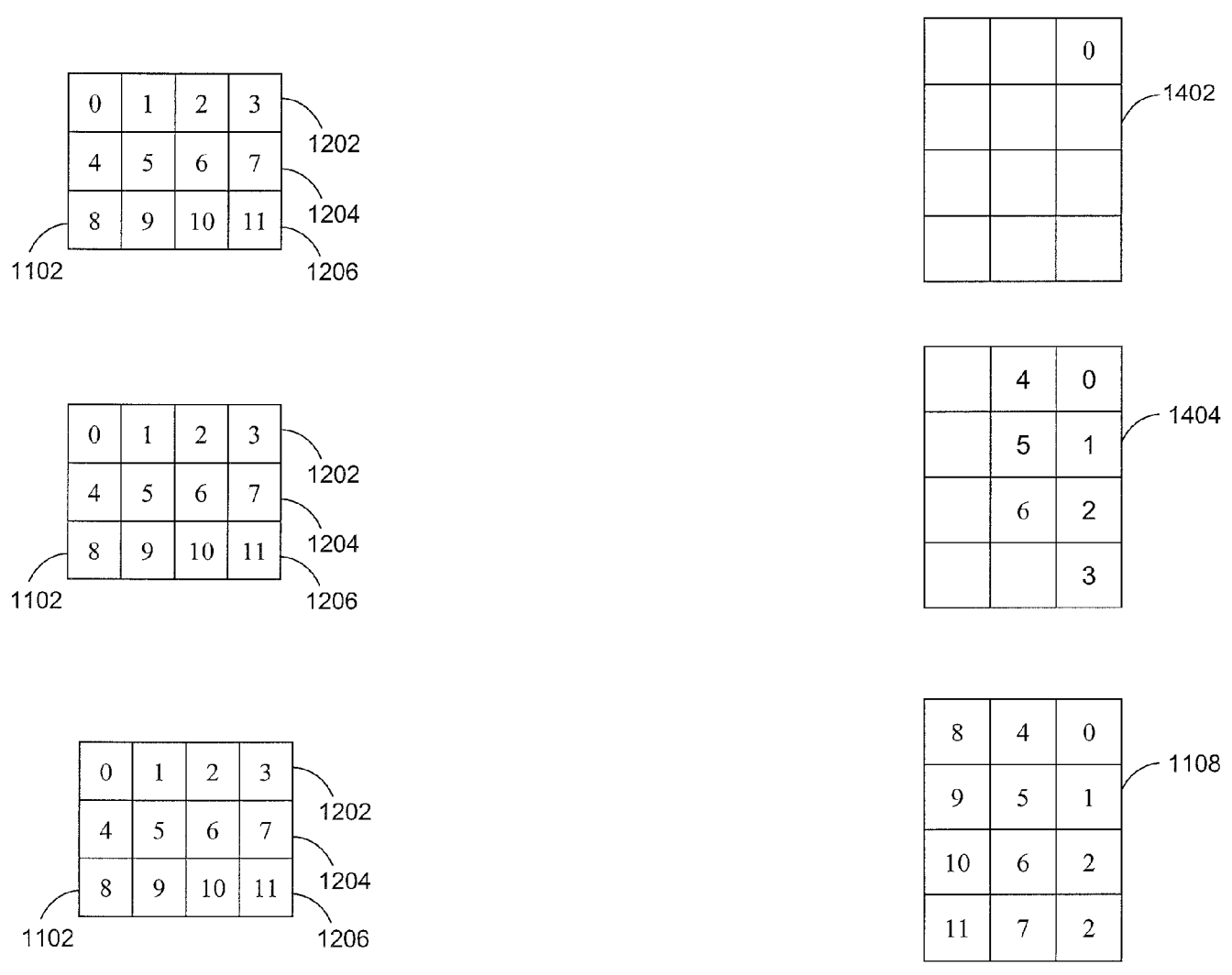

FIG. 16 shows how one embodiment may be implemented for rotating a source image by 270 degrees. The driver program code processes the request for displaying the source image 1102 at the 270 degree angle. A width of the image may be equal to a number of pixels in a line of each of the plurality of lines of the image. For example, the image 1102 may have a width of 4 pixels. A height of the image may be equal to a number of lines in the image. For example, the source image may have a height of 3 pixels.

Each pixel in each of the lines of the image 1102 is treated sequentially and transferred to the display memory. The width of the image rotated at the angle of rotation of 270 degree is equal to the height of the image 102 and the height of the image 1102 rotated at the angle of rotation of 270 degree is equal to the width of the image 1102, for example the width of the image 1102 rotated at the angle of 270 degree is 3 pixels and the height of the image 1102 rotated at the angle of rotation of 270 degree is 4 pixels.

Initially each of the plurality of pixels of the line 1202 of the image 1102 is transferred, each of the plurality of pixels of are transferred sequentially, for example initially the pixel 0 is transferred, a image after the transfer of the pixel 0 is shown with reference to an image 1402, thereafter the pixel 1 is transferred, and so on. Once, each of the plurality of pixels of the line 1202 are transferred to the display memory, then each of the plurality of pixels 4, 5, 6 and 7 of the line 1204 are transferred, the rotated image after the transfer of the pixels 0, 1, 2, 3, 4, 5 and 6 is shown with reference to an image 1404. Thereafter each of the plurality of pixels 8, 9, 10 and 11 of the line 1206 are transferred to the display memory and the rotated image 1108 is formed.

FIGS. 6A and 6B is a flow diagram showing steps included in a method for displaying the image on the display device. The method is initiated at step 1502 when a request for displaying the image 1102 on the display device is received by the driver program code. The request for displaying the image 1102 on the display device can be send by an application program, an operating system, or a user defined program interface. The request for displaying the image 1102 in rotated format is processed by the driver program code. At step 1504, an angle of rotation of the image 1102 is determined by the driver program code. At step 1506, the driver program code performs one of a first operation or a second operation after determining the angle of rotation. At step 1508 it is determined whether the first operation is to be performed or the second operation is to be performed.

The first operation is performed when the angle of rotation is the 180 degree and the second operation is performed when the angle of rotation is one of the 90 degree and the 270 degree. If the driver program code determines that the angle of rotation is 90, then the first operation is performed. The first operation includes, at step 1510 allocating a memory buffer for storing each of the plurality of lines 1202, 1204 and 1206 of the image 1102 in the memory buffer, the memory buffer is allocated for temporarily storing and processing each of the plurality of lines 1202, 1204 and 1206 of the image 1102. Each of the plurality of lines 1202, 1204 and 1206 are processed in the memory buffer, the processing of each of the plurality of lines includes reversing position of each of the plurality of pixels of each of the plurality of lines 1202, 1204 and 1206 at step 1512. For example the line 1202 is stored in the memory buffer and a position of each of the plurality of pixels 0, 1, 2, and 3 of the line 1202 is reversed and the line 1208 is formed.

Thereafter at step 1514, each of the plurality of lines are transferred pixel by pixel to the display memory, for example initially the line 1208 is transferred, pixel by pixel, initially pixel 0 is transferred, thereafter pixel 1 is transferred and so on. Thereafter, the line 1210 is transferred pixel by pixel, initially pixel 4 is transferred, and thereafter pixel 5 is transferred and so on. After transferring the line 1210, the line 1212 is transferred pixel by pixel, initially pixel 8 is transferred, and thereafter pixel 9 is transferred as so on. The image 1102 rotated at the angle of rotation of 180 degree takes up an orientation shown with reference to the rotated image 1104. If at step 1508 it is determined that the angle of rotation is on of the 90 degree and the 270 degree, then the second operation is performed.

The second operation includes at step 1516, orienting each of the plurality of pixels of each of the plurality of lines based on the angle of rotation of the image 1102. If the angle of rotation of the image is 90 degree, then each of the plurality of pixels of each of the plurality of lines 1202, 1204 and 1206 of the image 1102 are oriented as described earlier in FIG. 14. Thereafter at step 1518, each of the plurality of pixels of each of the plurality of lines 1202, 1204 and 1206 are transferred sequentially to the display memory of the display device. The image 1102 rotated at the angle of rotation of 90 degree takes up an orientation shown with reference to the rotated image 1106. If the angle of rotation of the image is 270 degree, then at step 1516 each of the plurality of pixels of each of the plurality of lines 1202, 1204 and 1206 of the image 1102 are oriented as described earlier in FIG. 15.

Thereafter at step 1518, each of the plurality of pixels of each of the plurality of lines 1202, 1204 and 1206 are transferred sequentially to the display memory of the display device. The image 1102 rotated at the angle of rotation of 270 degree takes up an orientation shown with reference to the rotated image 1108. The rotated image 1104, 1106, 1108 are displayed on the display device, according to the angle of rotation of the image 1102. The method terminates at step 1520.

Figure 18A:
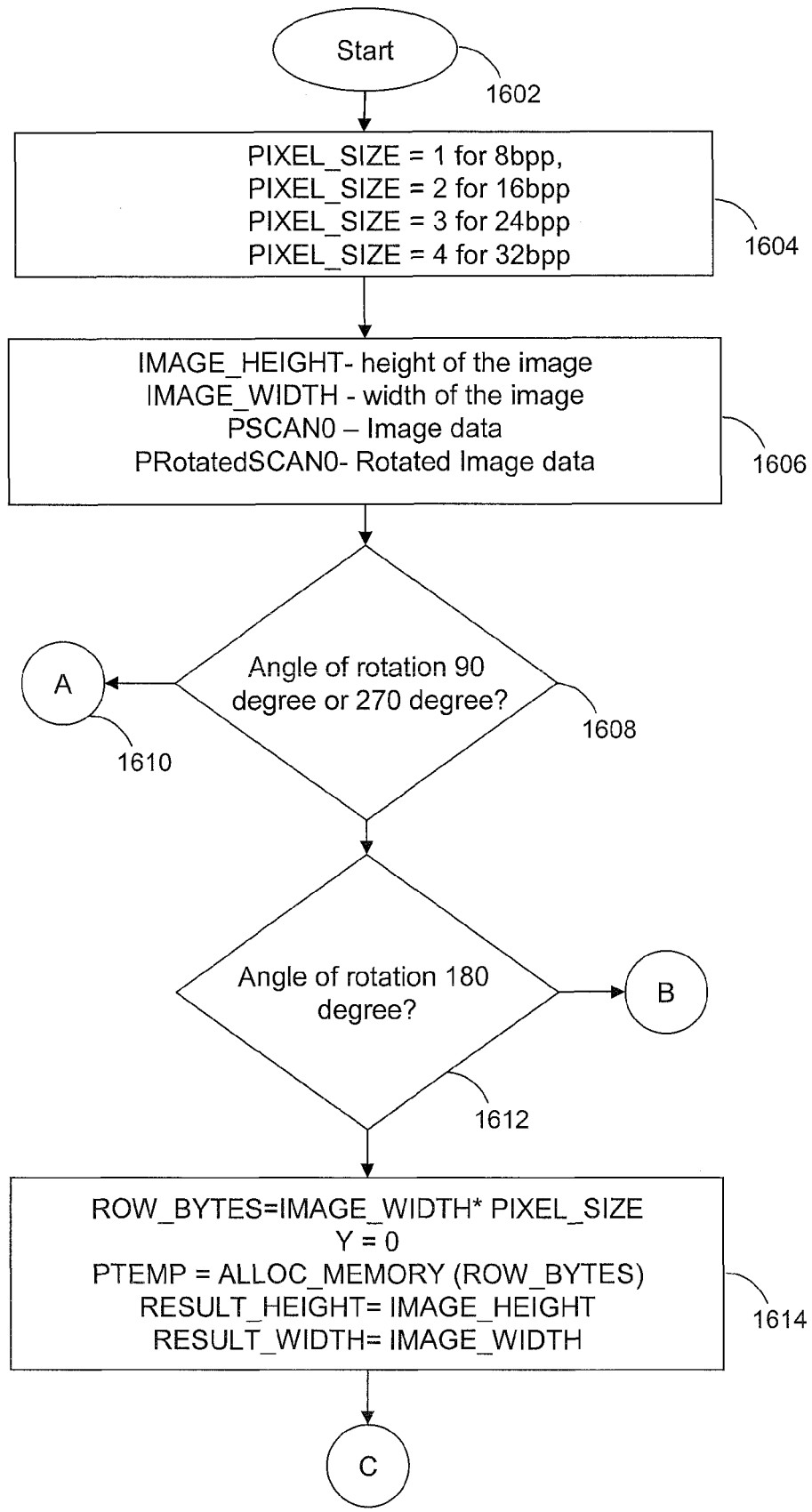
FIGS. 18A and 18B are flow diagrams showing an algorithm for rotating a source image at the angle of 180 degrees.
Figure 18B:
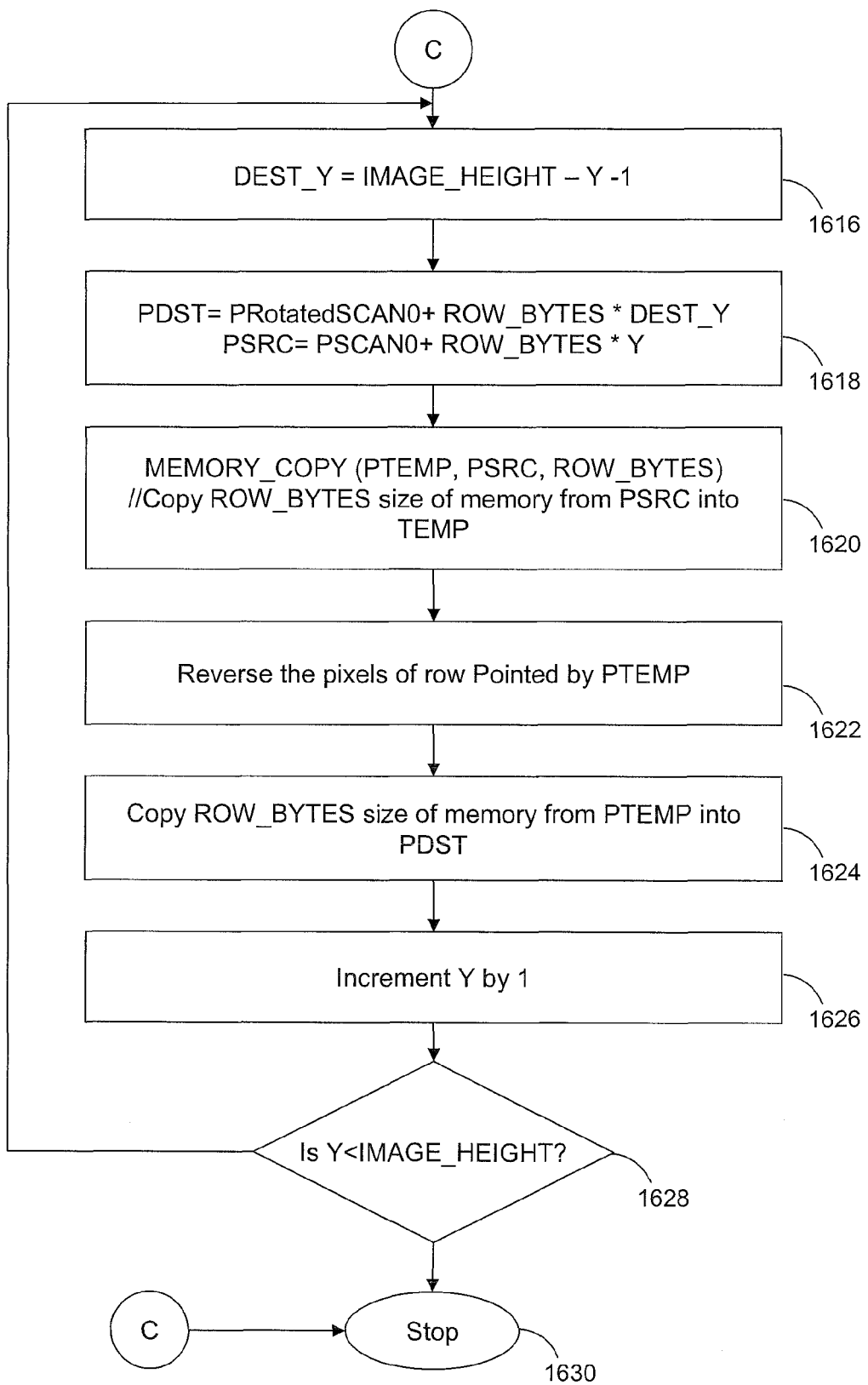

FIGS. 18A and 18B is a flow diagram illustrating an algorithm for rotation of the image at the angle of rotation of 180, according to an embodiment of the present invention. The method is initiated at step 1602. At step 1604, a size of each of the plurality of pixels of each of the plurality of lines 1202, 1204, 1206 of the image 1102 is determined and the size of each of the plurality of pixels is stored in the PIXEL_SIZE variable by the driver program code. The number of bits used to represent each of the plurality of pixels determines how many colors or shades of gray can be displayed. For example, in 8-bit color mode, 8 bits are assigned for each of the plurality of pixels, thereby making it possible to display up to 8th power of 2 (256) different colors or shades of gray of the image 1102. The size of the pixel can be selected by a user of the display device, the application program, or the operating system. The size of each of the plurality of pixels can be set to one of a 1 byte per pixel (Palette Mode), 2 bytes per pixel (High color Mode), 3 bytes per pixel (True color Packaged Mode), or 4 bytes per pixel (True color aligned Mode).

At step 1606, an IMAGE_HEIGHT variable is set equal to a height in pixels of the image 1102, for example the IMAGE_HEIGHT variable is set equal to the height 3. Further, at step 1606, an IMAGE_WIDTH variable is set equal to a width in pixels of the image 1102, for example the IMAGE_WIDTH variable is set equal to the width 4. Furthermore, at step 1606 a PSCANO variable is initialized, the PSCANO variable includes a data of the image 1102 in the source memory and the data includes a start address of the image 1102 in the source memory. Since the image 1102 is stored in the source memory in a contagious memory location, that is the pixel 0, pixel 1, pixel 2, pixel 3, pixel 4, pixel 5, pixel 6, pixel 7, pixel 8, pixel 9, pixel 10 and pixel 11 are stored in a contagious memory location, for example if the pixel 0 is stored at the memory address of x, then pixel 1 will be stored at the memory address x+1 and so on.

The PSCANO variable will include the start address of the image 1102, i.e. the PSCANO variable will include the memory address of pixel 0. Also, at step 1606, PRotatedSCANO variable is initialized, the PRotatedSCANO variable includes a data of the image 1102 rotated at the angle of rotation in the display memory of the display device. The PRotatedSCANO will include the start address of the image 1102 rotated at the angle of rotation in the display memory. The start address of the image 1102 specifies the memory address in the display memory from where the image 1102 is stored after the rotation at the angle of rotation of the image 1102.

At step 1608, it is determined by the driver program code, whether the angle of rotation of the image 1102 is 90 degree or 270 degree. If the angle of rotation is one of 90 degree or 270 degree, then control goes to step 1610, otherwise, the control goes to step 1612. At step 1612, the driver program code determines whether, the angle of rotation of the image is 180, if the angle of rotation of the image is 180 degree, then the control goes to step 1614, otherwise the method is terminated at step 1630. If the angle of rotation of the image 1102 is 180 degree, then a first set of a plurality of variables are initialized, the first set of the plurality of variables are a ROW_BYTES, a Y variable, PTEMP variable, a RESULT_HEIGHT variable, a RESULT_WIDTH variable, a DEST_Y variable, a PDST variable and a PSRC variable. At step 1614, the ROW_BYTES variable is set equal to a product of the IMAGE_WIDTH variable and the PIXEL_SIZE variable, for example if the PIXEL_SIZE variable is set equal to 1 byte and the IMAGE_WIDTH variable is set to 4, then the PHYSICAL_BYTE_WIDTH variable will be equal to 4 bytes.

Also, at step 1614, the Y variable is set equal to zero. The Y variable is set equal to zero and points to a first line of the plurality of lines of the image 1102, for example initially the line 1202 is pointed by the Y variable. Further, the memory buffer for temporarily storing each of the plurality of lines 1202, 1204 and 1206 and reversing position of each of the plurality of pixels is set. The memory buffer is set for each of the plurality of lines 1202, 1204, 1206. The starting address of the memory buffer for storing each of the plurality of lines 1202, 1204 and 1206 is stored in a PTEMP variable.

Further the memory buffer is allocated with a memory equal to the ROW_BYTES variable, i.e. for each of the plurality of lines 1202, 1204 and 1206, the memory buffer is set equal to the memory required for storing each of the plurality of lines 1202, 1204 and 1206. At step 1616, the DEST_Y variable is set equal to the IMAGE_HEIGHT−Y−1. At step 1618, the PDST variable is set equal to the sum of PRotatedSCANO and a product of ROW_BYTES variable and DEST_Y variable. Further, at step 1618, the PSRC variable is set equal to the sum of the PSCANO variable and the product of the ROW_BYTES variable and the Y variable. The PDST is a pointer variable for a line of the plurality of lines of the image formed after rotating the image 1102 at the angle of rotation of 180 degree.

The PSRC is a pointer variable for a line of the plurality of lines of the image 1102 stored in the source memory. Thereafter, at step 1620, each of the plurality of lines 1202, 1204 and 1206 of the image 1102 is transferred from the source memory to the memory buffer. At step 1622, each of the plurality of pixels of each of the plurality of lines is reversed as described earlier in conjunction with FIG. 14.

At step 1624, each of the plurality of lines is copied to the display memory from the memory buffer. At step 1626, the Y variable is incremented by 1 and points to a next line of each of the plurality of lines, i.e. Y=1 and points to the line 1204 of the image 1102. At step 1628, it is determined whether, the variable Y is less than the IMAGE_HEIGHT variable. If the variable Y is less than the IMAGE_HEIGHT variable, then the control goes to step 1614 and each of the first set of plurality of variables are updated. If at step 1628, it is determined, that the Y is greater than the IMAGE_HEIGHT variable, and then the method is terminated at step 1630. If Y is greater than the IMAGE_HEIGHT variable, then it specifies, that each of the plurality of lines of the image 1102 rotated at the angle of rotation of 180 degree is transferred to the display memory. The image 102 rotated at the angle of rotation of 180 degree is oriented as shown with reference to the rotated image 1104.

The method will be described below with reference to the image 1102. For example the PIXEL_SIZE of each of the plurality of pixels of the image 1102 is 32 bits per pixel (or 4 bytes per pixel) and the image 1102 is stored starting from an address of 0x1000 in the source memory. The image 1102 has the IMAGE_WIDTH of 4 and the IMAGE_HEIGHT of 3. The image 1102 is to be rotated by the angle of rotation of 180 degrees and stored in the display memory of the display device starting from a memory address of 0x5000. Since, the image 1102 rotated at the angle of rotation of 180 degree is to be stored from the memory address of 0x5000 in the display memory. Therefore, the PRotatedSCANO variable is set equal to 0x5000 and the PSCANO variable is set equal to 0x1000.

Thereafter, the ROW_BYTES variable is set equal to a product of the IMAGE_WIDTH variable and the PIXEL_SIZE variable. The ROW_BYTES variable will be set equal to 16 (4*4) and the Y variable is set equal to 0. The Y=0 points to the line 1202 of the image 1102. The Y variable is incremented after each of the plurality of pixels of the line 1202 are reversed and transferred to the display memory. Further, the RESULT_HEIGHT variable will be set equal to the IMAGE_HEIGHT variable and the RESULT_WIDTH variable will be set equal to the IMAGE_WIDTH variable as the angle of rotation of the image is 180. Therefore, the RESULT_HEIGHT variable is set equal to 3 and the RESULT_WIDTH variable is set equal to 4.

Thereafter, the DEST_Y variable is set equal to IMAGE_HEIGHT−Y−1, which is equal to 2 (3−0−1). The PDST variable is set equal to the sum of PRotatedSCANO and a product of the ROW_BYTES variable and the DEST_Y variable, the PDST variable is set equal to (0x5000+16*2), and which is set equal to 0x5020. Further, the PSRC variable is set equal to the sum of PSCANO variable and a product of the ROW_BYTES variable and the Y variable, the PSRC variable is set equal to (0x1000+16*0), and which is set equal to 0x1000. Thereafter, the 16 bytes of memory is copied from the memory address starting with the PSRC variable and the 16 bytes of memory is copied to the memory buffer starting from a memory address pointed by the PTEMP variable.

Thereafter, each of the plurality of pixels of the line 1202 is reversed in the memory buffer and the line 1208 reversed is transferred to the display memory starting. Thereafter, the Y variable is incremented by 1, and the control goes back to the step of setting the DEST_Y variable. The DEST_Y variable is set equal to IMAGE_HEIGHT−Y−1, which is equal to 1 (3−1−1).

The PDST variable is set equal to the sum of PRotatedSCANO and a product of the ROW_BYTES variable and the DEST_Y variable, for example the PDST variable is set equal to (0x5000+16*1), and which is set equal to 0x5010. Further, the PSRC variable is set equal to the sum of PSCANO variable and a product of the ROW_BYTES variable and the Y variable, the PSRC variable is set equal to (0x1000+16*1), and which is set equal to 0x1010. Thereafter, the 16 bytes of memory is copied from the memory address starting with the PSRC variable and the 16 bytes of memory is copied to the memory buffer starting from a memory address pointed by the PTEMP variable. Thereafter, each of the plurality of pixels of the line 1204 is reversed in the memory buffer and the line 1210 reversed is transferred to the display memory.

Thereafter, the Y variable is incremented by 1, and the control goes back to the step of setting the DEST_Y variable. The DEST_Y variable is set equal to IMAGE_HEIGHT−Y−1, which is equal to 1 (3−2−1). The PDST variable is set equal to the sum of PRotatedSCANO and a product of the ROW_BYTES variable and the DEST_Y variable, for example the PDST variable is set equal to (0x5000+16*0), and which is set equal to 0x5000.

Further, the PSRC variable is set equal to the sum of PSCANO variable and a product of the ROW_BYTES variable and the Y variable, the PSRC variable is set equal to (0x1000+16*2), and which is set equal to 0x1020. Thereafter, the 16 bytes of memory is copied from the memory address starting with the PSRC variable and the 16 bytes of memory is copied to the memory buffer starting from a memory address pointed by the PTEMP variable. Thereafter, each of the plurality of pixels of the line 1206 is reversed in the memory buffer and the line 1212 reversed is transferred to the display memory.

Figure 19A:
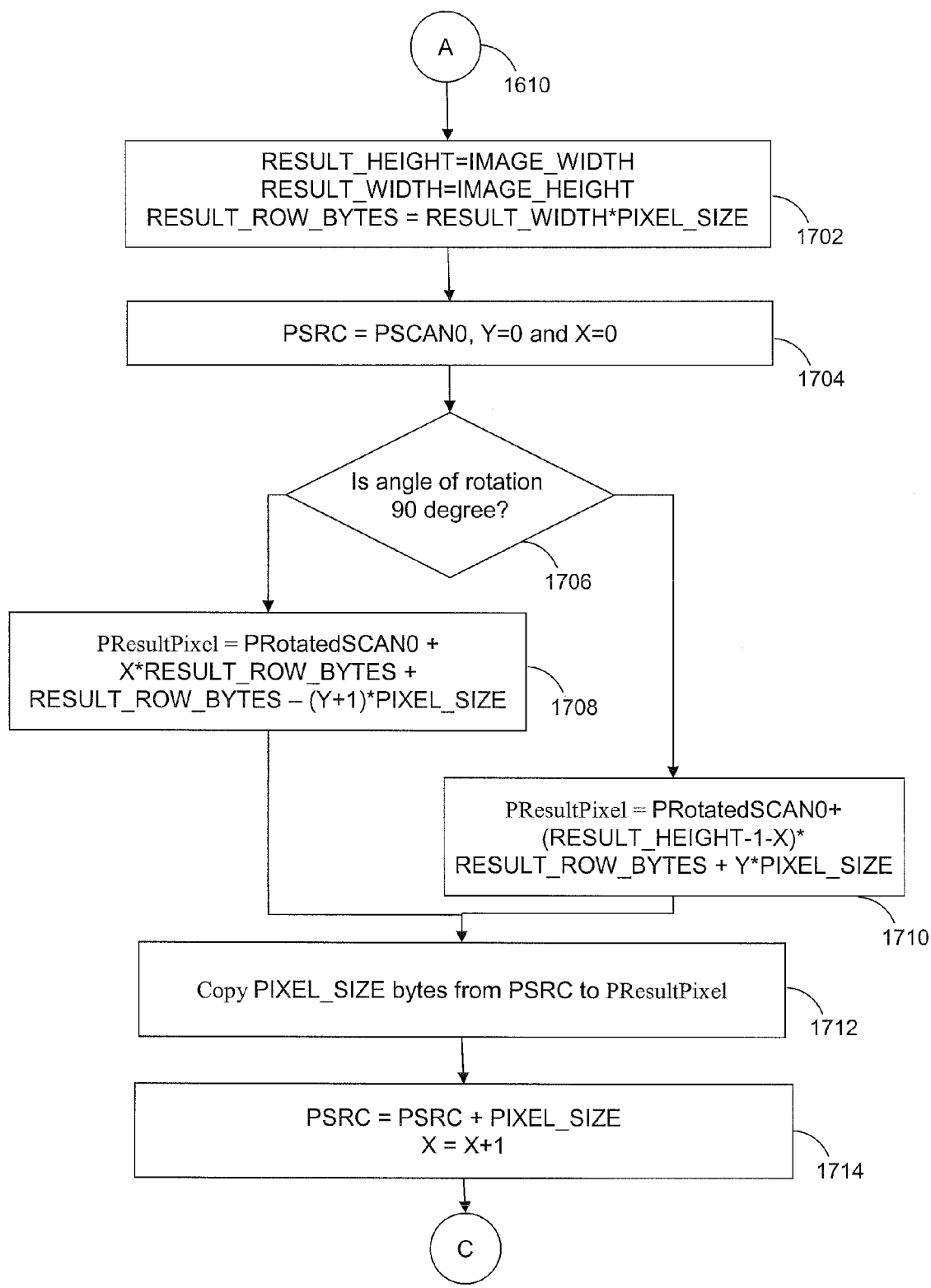
FIGS. 19A and 19B are flow diagrams showing an algorithm for rotating a source image at the angle of 90 degrees or 270 degrees.
Figure 19B:
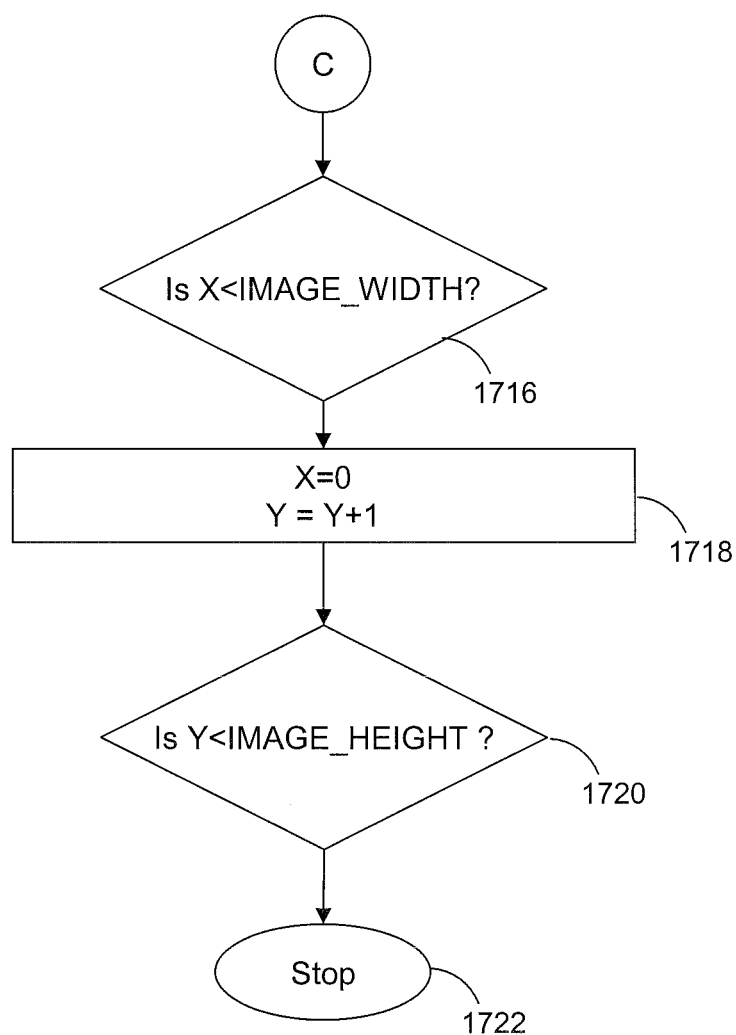

FIGS. 19A and 19B is a flow diagram illustrating an algorithm for rotation of the image 1102 at the angle of rotation of 90 degree or at the angle of rotation of 270 degree, according to an embodiment of the present invention. If at step 1608, it is determined by the driver program code that the angle of rotation of the image 1102 is 90 degree or 270 degree, then the control goes to step 1610. The control goes from step 1610 to a step 1702. A second set of plurality of variables are initialized. The image 1102 is oriented according to the angle of rotation of the image 1102 and by updating the second set of plurality of variables. The second set of plurality of variables include, the RESULT_HEIGHT variable, the RESULT_WIDTH variable, a RESULT_ROW_BYTES variable, a PResultPixel variable, the PSRC variable, the PRotatedSCANO variable, an X variable and the Y variable.

At step 1702, the RESULT_HEIGHT variable is set equal to the IMAGE_WIDTH variable and the RESULT_WIDTH variable is set equal to the IMAGE_HEIGHT variable. Since, when the image 1102 is rotated at the angle of rotation of 90 degree or 270 degree, then the image 1102 takes up an orientation in which the height of the rotated image is set equal to the width of the image 1102 and the width of the rotated image is set equal to the height of the image 1102. The RESULT_HEIGHT variable will be set equal to 4 and the RESULT_WIDTH is set equal to 3.

Further, at step 1702, a RESULT_ROW_BYTES variable is set equal to the product of RESULT_WIDTH variable and the PIXEL_SIZE variable. At step 1704, the PSCRC variable is set equal to the PSCANO variable and the variable Y and the variable X are initialized to zero. The (X, Y) corresponds to a coordinate of the image 102. At step 1706, it is determined whether the angle of rotation of the image 1102 is 90 degree or 270 degree. If the angel of rotation of the image is 90 degree, then the control goes to step 1710. If the angle of rotation of the image is 270 degree, then the control goes to step 1708.

At step 1710, the PResultPixel variable is set equal to the PRotatedSCANO+(RESULT_HEIGHT−1−X)*RESULT_ROW_BYTES+Y*PIXEL_SIZE and the control goes to step 1712. The step 1710 is used for setting the memory address of the rotated image in the display memory. The PResultPixel is a pointer to a pixel of the plurality of pixels of each of the plurality of lines in the rotated image. If at step 1706 it is determined that the angle of rotation of the image 1102 is 270 degree, then at step 1708, the PResultPixel variable is set equal to the PResultPixel=PRotatedSCAN0+X*RESULT_ROW_BYTES+RESULT_ROW_BYTES−(Y+1)*PIXEL_SIZE and the control goes to step 1712. At step 712, each of the plurality of pixels of each of the plurality of lines 1202, 1204 and 1206 of the image 1102 are copied to the display memory.

The said operation is done by copying the PIXEL_SIZE bytes corresponding to each of the plurality of pixels from the PSRC variable to the PResultPixel variable. At step 1714, the PSRC variable is updated and is set equal to the sum of the PSRC variable and the PIXEL_SIZE variable. Further, at step 1714, the variable X is incremented by 1, thereby pointing to a next pixel of each of the plurality of pixels.

At step 1716, it is determined, whether the X variable is less than the IMAGE_WIDTH variable. If the variable X is less than the IMAGE_WIDTH variable, then the control goes to step 1706. If X variable is less than the image width, then it shows that each of the plurality of pixels of a line of each of the plurality of lines is not copied to the display memory and the control goes to step 1706. If at step 1716, it is determined that X is greater than or equal to IMAGE_WIDTH, then the control goes to step 1718. If X is greater than or equal to the IMAGE_WIDTH, then it shows that each of the plurality of pixels corresponding to a line of the plurality of lines is transferred to the display memory.

At step 1718, the Y variable is incremented by 1, the Y variable now points to a next line of the plurality of lines of the image 1102. At step 1720, it is determined whether, the Y variable is less than the IMAGE_HEIGHT. If the variable Y is less than the IMAGE_HEIGHT, this shows that each of the plurality of lines is not transferred to the display memory, therefore the control goes to step 1706. If the variable Y is greater than or equal to the IMAGE_HEIGHT variable, then it shows that each of the plurality of lines is transferred sequentially to the display memory and therefore, the method gets terminated at step 1722.

The said method will be described below with reference to the image 1102. For example the PIXEL_SIZE of each of the plurality of pixels of the image 1102 is 32 bits per pixel (or 4 bytes per pixel) and the image 1102 is stored starting from an address of 0x1000 in the source memory. The image 1102 has the IMAGE_WIDTH of 4 and the IMAGE_HEIGHT of 3. The image 1102 is to be rotated by the angle of rotation of 90 degree or 270 degree and stored in the display memory of the display device starting from a memory address of 0x5000. Since, the image 1102 rotated at the angle of rotation of one of 90 degree or 270 degree is to be stored from the memory address of 0x5000 in the display memory, therefore the PRotatedSCAN0 variable is set equal to 0x5000 and the PSCAN0 variable is set equal to 0x1000.

Thereafter, the RESULT_HEIGHT variable will be set equal to the IMAGE_WIDTH variable and the RESULT_WIDTH variable will be set equal to the IMAGE_HEIGHT variable as the angle of rotation of the image is one of 90 degree or 270 degree. Therefore, the RESULT_HEIGHT variable is set equal to 4 and the RESULT_WIDTH variable is set equal to 3. The RESULT_ROW_BYTES variable is set equal to a product of the RESULT_WIDTH variable and the PIXEL_SIZE variable. The RESULT_ROW_BYTES variable will be set equal to 12 (3*4). Further, the PSRC variable is set equal to the PSCAN0 variable and therefore, the PSRC variable is set equal to 0X1000. Also, the X variable and the Y variable are set equal to 0.

Thereafter, it is determined, whether the angle of rotation of the image 1102 is 90 degree or 270 degree. If the angle of rotation of the image 1102 is 90 degree, then the PResultPixel variable is set equal to PRotatedSCAN0+(RESULT_HEIGHT−1−X)* RESULT_ROW_BYTES+Y*PIXEL_SIZE, which is set equal to (0x5000+(4−1−0)*12+0*4), that is equal to 0x5024. In case the angle of rotation of the image 1102 is 270 degree, then the PResultPixel is set equal to PRotatedSCAN0+X*RESULT_ROW_BYTES+RESULT_ROW_BYTES−(Y+1)*PIXEL_SIZE, which is set equal to (0x5000+0*12+12−(0+1)*4), that is equal to 0x5008. Thereafter a pixel of the plurality of pixels of the image 1102 is copied from the memory address pointed by the PSRC variable (0x1000) to the memory address pointed by the PResultPixel (0x5008) in the display memory.

Thereafter, the PSRC variable is updated and set equal to the PSRC+PIXEL_SIZE, which is equal to (0x1000+4), that is equal to 0x1004. Further, the X variable is incremented by 1. Thereafter, it is checked if the X variable is less than the IMAGE_WIDTH variable, which is X-0 is less than the IMAGE_WIDTH variable, which is equal to 4, therefore the said steps of updating the PResultPixel are performed, till the value of X becomes more than IMAGE_WIDTH variable, that is till all the pixel of the line 1202 are copied to the display memory. Thereafter, if the X variable is more than or equal to IMAGE_WIDTH, then the X Variable is set equal to 0, and the Y variable is incremented by 1.

Thereafter, it is determined whether, the Y variable is less than the IMAGE_HEIGHT variable, if the Y variable is less than the IMAGE_HEIGHT variable, then the PResultPixel is updated and each of the plurality of pixels of the line 1204, and line 1206 are copied to the display memory, as described earlier for copying each of the plurality of pixels of the line 1202.

The embodiments described herein may be embodied in a computer program product for displaying an image on a display device. In case of the angle of rotation of 180 degrees, this embodiment transfers stores each of the plurality of lines of the source image in one or more memory buffers. The positions of pixels in these lines is then reversed, and then each of the reversed lines are transferred to the display memory based on the desired change in orientation, e.g., rotation. Further, in case of the angle of rotation of 90 degree, each of the pixels in each line is transferred sequentially to the display memory.

The driver program code changes the orientation of the image in a plurality of modes, and does way with a need of having a different program code for each of the plurality of modes, therefore leading to a decreased usage of memory space in the display memory.

Additional embodiments correspond to computer program code containing instructions for implementing the method steps disclosed herein. The code may be stored in tangible media, such as floppy diskettes, CD-ROMs, hard drives, or any other computer-readable storage medium, wherein, when the computer program code is loaded into and executed by a computer, the computer becomes an apparatus for practicing the invention.

Additional embodiments correspond to computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is understood that various omissions, substitutions of equivalents are contemplated as circumstance may suggest or render expedient, but is intended to cover the application or implementation without departing from the spirit or scope of the claims of the present invention.

What is claimed is:

1. A method for controlling display of an image, comprising:
    (a) dividing a source image into a plurality of M×N blocks of pixels;

(b) selecting a first one of the blocks;
(c) transferring the pixels in the first block from a source memory to a display memory, the pixels in the first block transferred based on orientation change information; and
(d) repeating (b) and (c) to transfer pixels in remaining ones of the blocks to the display memory, wherein 2≤M<total number of lines in the source image and wherein 2≤N<total number of pixels in any image line in the source image, wherein:
the pixels in the first block are transferred to the display memory before all pixels in a preceding line of the source image are transferred to the source memory,
all pixels in a horizontal line of the first block are transferred to the display memory before pixels in a subsequent horizontal line of the first block are transferred to the display memory, and
when all the pixels in the source image are not fully covered by the blocks in spite of dividing the source image according to (a), a remaining area of the source image is transferred pixel-by-pixel to the display memory after the divided blocks of pixels are transferred.

2. The method of claim 1, wherein all the divided blocks of the source image have a same size.

3. The method of claim 1, sequentially transferring each line of pixels in the first block to the display memory based on said orientation change information.

4. The method of claim 1, wherein said orientation change information provides an indication of an angle of rotation of the source image.

5. The method of claim 1, wherein the blocks are transferred sequentially to the display memory.

6. The method of claim 1, wherein (c) includes:
controlling pointers of the source and display memories to transfer the pixels in the first block from the source memory to the display memory.

7. The method of claim 1, further comprising:
displaying the source image with an orientation that corresponds to said orientation change information based on the blocks of pixels transferred to the display memory.

8. A system for controlling display of an image, comprising:
a display memory;
a source memory to store a source image; and
a controller to control transfer of the source image from the source memory into the display memory based on orientation change information, the controller transferring the source image by:
(a) dividing the source image into a plurality of M×N blocks of pixels;
(b) selecting a first one of the blocks;
(c) transferring the pixels in the first block from a source memory to a display memory based said on orientation change information; and
(d) repeating (b) and (c) to transfer pixels in remaining ones of the blocks to the display memory, wherein 2≤M<total number of lines in the source image and wherein 2≤N<total number of pixels in any image line in the source image, wherein the controller:
transfers the pixels in the first block to the display memory before all pixels in a preceding line of the source image are transferred to the source memory,
transfers all pixels in a horizontal line of the first block to the display memory before pixels in a subsequent horizontal line of the first block are transferred to the display memory, and
when all the pixels in the source image are not fully covered by the blocks in spite of dividing the source image according to (a), transfers a remaining area of the source image pixel-by-pixel to the display memory after the divided blocks of pixels are transferred.

9. The system of claim 8, wherein all the divided blocks of the source image have a same size.

10. The system of claim 8, wherein the controller sequentially transfers each line of pixels in the first block to the display memory based on said orientation change information.

11. The system of claim 8, wherein said orientation change information provides an indication of an angle of rotation of the source image.

12. The system of claim 8, wherein the controller transfers the blocks sequentially to the display memory.

13. The system of claim 8, wherein, in (c), the controller controls pointers of the source and display memories to transfer the pixels in the first block from the source memory to the display memory.

14. The system of claim 13, wherein the controller controls display of the source image with an orientation that corresponds to said orientation change information based on the blocks of pixels transferred to the display memory.

* * * * *